US012610089B2

(12) United States Patent
Kwong et al.

(10) Patent No.: US 12,610,089 B2
(45) Date of Patent: Apr. 21, 2026

(54) METHOD AND SYSTEM FOR LEARNING-BASED BIDIRECTIONAL VIDEO COMPRESSION

(71) Applicant: City University of Hong Kong, Kowloon (HK)

(72) Inventors: Sam Tak Wu Kwong, Kowloon (HK); Haifeng Guo, Kowloon (HK); Shiqi Wang, Kowloon (HK)

(73) Assignee: City University of Hong Kong, Kowloon (HK)

( * ) Notice: Subject to any disclaimer, the term of this patent is extended or adjusted under 35 U.S.C. 154(b) by 28 days.

(21) Appl. No.: 18/624,518

(22) Filed: Apr. 2, 2024

(65) Prior Publication Data

US 2025/0310574 A1 Oct. 2, 2025

(51) Int. Cl.
| | |
|---|---|
| *H04N 19/91* | (2014.01) |
| *G06V 10/44* | (2022.01) |
| *G06V 10/74* | (2022.01) |
| *H04N 19/172* | (2014.01) |
| *H04N 19/51* | (2014.01) |

(52) U.S. Cl.
CPC ............. *H04N 19/91* (2014.11); *G06V 10/44* (2022.01); *G06V 10/761* (2022.01); *H04N 19/172* (2014.11); *H04N 19/51* (2014.11)

(58) Field of Classification Search
CPC ...... H04N 19/91; H04N 19/172; H04N 19/51; G06V 10/761; G06V 10/44
See application file for complete search history.

(56) References Cited

U.S. PATENT DOCUMENTS

| | | | |
|---|---|---|---|
| 10,623,775 | B1 | 4/2020 | Theis et al. |
| 10,977,553 | B2 | 4/2021 | Rippel et al. |
| 2007/0016405 | A1* | 1/2007 | Mehrotra .............. G10L 19/025 |
| | | | 704/203 |

(Continued)

FOREIGN PATENT DOCUMENTS

| | | |
|---|---|---|
| CN | 111405283 | 7/2020 |

OTHER PUBLICATIONS

V. Sze, M. Budagavi, and G. J. Sullivan, "High efficiency video coding (HEVC)," in Integrated Circuit and Systems, Algorithms and Architectures. Springer, 2014, vol. 39, p. 40.

(Continued)

*Primary Examiner* — Zaihan Jiang
(74) *Attorney, Agent, or Firm* — Renner, Kenner, Greive, Bobak, Taylor & Weber

(57) ABSTRACT

A computer-implemented method for learning-based bidirectional video compression includes, given a current frame, generating a single reference frame from the current frame and bidirectional frames by using a neural network, estimating a motion between the current frame and the reference frame, obtaining a reconstructed motion by inputting the motion to a motion encoder and decoder, generating a set of temporal contexts based on the reconstructed motion and propagated feature, and compressing the current frame based on the temporal contexts by an inverse channel-wise entropy model which is adapted to reconstruct the relationship among channels such that the channels with less entropy are coded first and the channels with larger entropy are coded with the help of the previously coded channels.

17 Claims, 26 Drawing Sheets

(56)　　　　　　References Cited

U.S. PATENT DOCUMENTS

| 2007/0016412 | A1* | 1/2007 | Mehrotra | G10L 19/0208 |
| | | | | 704/229 |
| 2007/0016414 | A1* | 1/2007 | Mehrotra | G10L 19/038 |
| | | | | 704/E19.017 |
| 2021/0057084 | A1* | 2/2021 | Takeshima | G16H 30/40 |
| 2023/0421754 | A1* | 12/2023 | Zhao | G06N 3/08 |
| 2024/0071039 | A1* | 2/2024 | Eswara | H04N 19/146 |
| 2024/0129487 | A1* | 4/2024 | Wang | G06T 3/18 |
| 2024/0146963 | A1* | 5/2024 | Chen | H04N 19/172 |
| 2024/0185075 | A1* | 6/2024 | Du | G06N 3/084 |
| 2024/0251098 | A1* | 7/2024 | Chen | H04N 19/543 |
| 2024/0314357 | A1* | 9/2024 | Wang | H04N 19/172 |
| 2025/0008094 | A1* | 1/2025 | Deshpande | H04N 19/80 |
| 2025/0088636 | A1* | 3/2025 | Chen | H04N 19/137 |

OTHER PUBLICATIONS

B. Bross, Y.-K. Wang, Y. Ye, S. Liu, J. Chen, G. J. Sullivan, and J.R. Ohm, "Overview of the versatile video coding (VVC) standard and its applications," IEEE Transactions on Circuits and Systems for Video Technology, vol. 31, No. 10, pp. 3736-3764, 2021.

G. Lu, W. Ouyang, D. Xu, X. Zhang, C. Cai, and Z. Gao, "DVC: An end-to-end deep video compression framework," in Proceedings of the IEEE International Conference on Computer Vision, 2019, pp. 11 006-11 015.

T. Ladune, P. Philippe, W. Hamidouche, L. Zhang, and O. D'eforges, "Optical flow and mode selection for learning-based video coding," in IEEE International Workshop on Multimedia Signal Processing, 2020, pp. 1-6.

J. Li, B. Li, and Y. Lu, "Deep contextual video compression," Proceedings of Advances in Neural Information Processing Systems, vol. 34, pp. 18 114-18 125, 2021.

J. Lin, D. Liu, H. Li, and F. Wu, "M-LVC: Multiple frames prediction for learned video compression," in Proceedings of the IEEE Conference on Computer Vision and Pattern Recognition, 2020, pp. 3546-3554.

R. Yang, F. Mentzer, L. V. Gool, and R. Timofte, "Learning for video compression with hierarchical quality and recurrent enhancement," in Proceedings of the IEEE Conference on Computer Vision and Pattern Recognition, 2020, pp. 6628-6637.

M. A. Yilmaz and A. M. Tekalp, "End-to-end rate-distortion optimized learned hierarchical bi-directional video compression," IEEE Transactions on Image Processing, vol. 31, pp. 974-983, 2021.

R. Pourreza and T. Cohen, "Extending neural p-frame codecs for b-frame coding," in Proceedings of the IEEE International Conference on Computer Vision, 2021, pp. 6680-6689.

H. Jiang, D. Sun, V. Jampani, M.-H. Yang, E. Learned-Miller, and J. Kautz, "Super slomo: High quality estimation of multiple intermediate frames for video interpolation," in Proceedings of the IEEE Conference on Computer Vision and Pattern Recognition, 2018, pp. 9000-9008.

D. Minnen, J. Ball'e, and G. D. Toderici, "Joint autoregressive and hierarchical priors for learned image compression," Proceedings of Advances in Neural Information Processing Systems, vol. 31, 2018.

D. He, Y. Zheng, B. Sun, Y. Wang, and H. Qin, "Checkerboard context model for efficient learned image compression," in Proceedings of the IEEE International Conference on Computer Vision, 2021, pp. 14 771-14 780.

J. Li, B. Li, and Y. Lu, "Hybrid spatial-temporal entropy modelling for neural video compression," in Proceedings of the ACM International Conference on Multimedia, 2022, pp. 1503-1511.

J. Li, B. Li, and Y. Lu, "Neural video compression with diverse contexts," Proceedings of the IEEE Conference on Computer Vision and Pattern Recognition, pp. 22 616-22 626, 2023.

D. He, Z. Yang, W. Peng, R. Ma, H. Qin, and Y. Wang, "ELIC: Efficient learned image compression with unevenly grouped space-channel contextual adaptive coding," in Proceedings of the IEEE Conference on Computer Vision and Pattern Recognition, 2022, pp. 5718-5727.

D. Minnen and S. Singh, "Channel-wise autoregressive entropy models for learned image compression," in 2020 IEEE International Conference on Image Processing (ICIP). IEEE, 2020, pp. 3339-3343.

J. Ball'e, V. Laparra, and E. P. Simoncelli, "End-to-end optimized image compression," in International Conference on Learning Representations, 2017.

J. Ball'e, D. Minnen, S. Singh, S. J. Hwang, and N. Johnston, "Variational image compression with a scale hyperprior," in International Conference on Learning Representations, 2018.

T. Chen, H. Liu, Z. Ma, Q. Shen, X. Cao, and Y. Wang, "End-to-end learnt image compression via non-local attention optimization and improved context modeling," IEEE Transactions on Image Processing, vol. 30, pp. 3179-3191, 2021.

Z. Cheng, H. Sun, M. Takeuchi, and J. Katto, "Learned image compression with discretized gaussian mixture likelihoods and attention modules," in Proceedings of the IEEE Conference on Computer Vision and Pattern Recognition, 2020, pp. 7939-7948.

Z. Pan, X. Yi, Y. Zhang, B. Jeon, and S. Kwong, "Efficient in-loop filtering based on enhanced deep convolutional neural networks for hevc," IEEE Transactions on Image Processing, vol. 29, pp. 5352-5366, 2020.

A. Ranjan and M. J. Black, "Optical flow estimation using a spatial pyramid network," in Proceedings of the IEEE Conference on Computer Vision and Pattern Recognition, 2017, pp. 4161-4170.

Z. Hu, Z. Chen, D. Xu, G. Lu, W. Ouyang, and S. Gu, "Improving deep video compression by resolution-adaptive flow coding," in Proceedings of the European Conference on Computer Vision, 2020, pp. 193-209.

H. Guo, S. Kwong, C. Jia, and S. Wang, "Enhanced motion compensation for deep video compression," IEEE Signal Processing Letters, vol. 30, pp. 673-677, 2023.

Z. Guo, R. Feng, Z. Zhang, X. Jin, and Z. Chen, "Learning cross-scale weighted prediction for efficient neural video compression," IEEE Transactions on Image Processing, vol. 32, pp. 3567-3579, 2023.

D. Jin, J. Lei, B. Peng, Z. Pan, L. Li, and N. Ling, "Learned video compression with efficient temporal context learning," IEEE Transactions on Image Processing, vol. 32, pp. 3188-3198, 2023.

E. Agustsson, D. Minnen, N. Johnston, J. Balle, S. J. Hwang, and G. Toderici, "Scale-space flow for end-to-end optimized video compression," in Proceedings of the IEEE Conference on Computer Vision and Pattern Recognition, 2020, pp. 8503-8512.

X. Sheng, J. Li, B. Li, L. Li, D. Liu, and Y. Lu, "Temporal context mining for learned video compression," IEEE Transactions on Multimedia, 2022.

H. Guo, S. Kwong, D. Ye, and S. Wang, "Enhanced context mining and filtering for learned video compression," IEEE Transactions on Multimedia, pp. 1-13, 2023.

H. Wang and Z. Chen, "Exploring long- and short-range temporal information for learned video compression," IEEE Transactions on Image Processing, vol. 33, pp. 780-792, 2024.

D. Alexandre, H.-M. Hang, and W.-H. Peng, "Hierarchical B-frame Video Coding Using Two-Layer CANF without Motion Coding," in Proceedings of the IEEE Conference on Computer Vision and Pattern Recognition, 2023, pp. 10 249-10 258.

R. Zhang, P. Isola, A. A. Efros, E. Shechtman, and O. Wang, "The unreasonable effectiveness of deep features as a perceptual metric," in Proceedings of the IEEE Conference on Computer Vision and Pattern Recognition, 2018, pp. 586-595.

Z. Hu, G. Lu, and D. Xu, "Fvc: A new framework towards deep video compression in feature space," in Proceedings of the IEEE Conference on Computer Vision and Pattern Recognition, 2021, pp. 1502-1511.

F. Bossen et al., "Common test conditions and software reference configurations," JCTVC-L1100, vol. 12, No. 7, 2013.

A. Mercat, M. Viitanen, and J. Vanne, "UVG dataset: 50/120fps 4k sequences for video codec analysis and development," in Proceedings of the ACM Multimedia Systems Conference, 2020, pp. 297-302.

H. Wang, W. Gan, S. Hu, J. Y. Lin, L. Jin, L. Song, P. Wang, I. Katsavounidis, A. Aaron, and C.-C. J. Kuo, "MCL-JCV: A JNDbased

(56) References Cited

OTHER PUBLICATIONS

H. 264/AVC video quality assessment dataset," in Proceedings of International Conference on Image Processing, 2016, pp. 1509-1513.

I. Loshchilov and F. Hutter, "Decoupled weight decay regularization," International Conference on Learning Representations, 2018.

F. L. Vadim Seregin, Jie Chen and K. Zhang, "JVET AHG report: ECM software development (AHG6)," in JVET-AA0006, 2022.

G. Bjontegaard, "Calculation of Average PSNR Differences between RD-curves (VCEG-M33)," in VCEG Meeting (ITU-T SG16 Q. 6), 2001, pp. 2-4.

G. Lu, C. Cai, X. Zhang, L. Chen, W. Ouyang, D. Xu, and Z. Gao, "Content adaptive and error propagation aware deep video compression," 2020.

R. Yang, F. Mentzer, L. Van Gool, and R. Timofte, "Learning for video compression with recurrent auto-encoder and recurrent probability model," IEEE Journal of Selected Topics in Signal Processing, vol. 15, No. 2, pp. 388-401, 2020.

* cited by examiner

VTM (0.0308/34.1121)

Origin (bpp/PSNR(dB))

DCVC (0.0369/32.1162)

ECM (0.0247/33.8268)

DCVC_HEM (0.0422/35.7376)

DCVC_TCM (0.0444/35.4068)

Ours (0.0225/36.5326)

DCVC_DC (0.0399/35.7495)

METHOD AND SYSTEM FOR LEARNING-BASED BIDIRECTIONAL VIDEO COMPRESSION

TECHNICAL FIELD

The present invention relates to methods and systems for learning-based bidirectional video compression.

BACKGROUND

During the past few years, neural video codecs have drawn much attention and shown great potential for compressing video with deep learning methods. Different from the "hand-crafted" classical codec standards, such as HEVC [1] and VVC [2], the neural approaches are implemented end to end. Lu et al. [3] propose the first method by replacing classical codec components with neural networks, called Deep Video Compression (DVC). In DVC, the motion and residual are calculated and compressed separately. Subsequently, considering the entropy of conditional coding is smaller [4], Li et al. [5] utilize the predicted feature context as a condition and propose the Deep Contextual Video Compression (DCVC).

Based on the above two methods, many approaches are explored further to improve the compression performance of neural codecs. Lin et al. [6] propose to generate a more accurate prediction frame with multiple MV fields and associated reference frames. Moreover, to fully utilize the concept of the bidirectional frames, Yang et al. [7] propose the Hierarchical Learned Video Compression (HLVC) method, which features three hierarchical quality layers bidirectionally. Meanwhile, Yılmaz et al. [8] propose the Learned Hierarchical BiDirectional Video Compression (LHBDC) with hierarchical motion-compensated prediction. Furthermore, Pourreza et al. [9] interpolate two reference frames to generate a single frame. A fixed hierarchical structure based on bidirectional flow and warping is applied in HLVC [7] and LHBDC [8]. In [9], the method is developed on Super-Slomo [10], which is proposed for converting the video to high frame rate slow motion video and suitable for video with small motion. However, the motion is much more complex in reality.

SUMMARY OF THE INVENTION

The present disclosure relates to a novel learning-based bidirectional video compression method designed to enhance compression performance. Contrary to previous bidirectional approaches, which typically assume a uniformly distributed motion that can be predicted using a fixed hierarchical structure, the proposed method employs two reference frames to produce a single reference frame for conditional compression. Specifically, in some embodiments, a Siamese neural network is leveraged to acquire feature similarity values from the two reference frames. These values, in conjunction with related frames, are utilized to generate a single reference frame for conditional compression. Furthermore, some embodiments of the invention take into account the entropy distribution across channels. This insight informs the design of an inverse channel-wise entropy model for the proposed bidirectional framework, thereby augmenting the overall compression efficiency. In addition, some embodiments of the invention restructure the relationship among channels to predict channel parameters. This is achieved by considering the direction of information accumulation, lending another layer of sophistication to the proposed method. Experiment results demonstrate the correctness and effectiveness of the above designs. The proposed bidirectional framework can outperform the Versatile Video Coding (VVC) Low-Delay B configuration, achieving an average of 11.29%/54.34% bit savings with PSNR/MS-SSIM-oriented optimization.

According to the first aspect of the invention, there is provided a computer-implemented method for learning-based bidirectional video compression, which includes given a current frame, generating a single reference frame from the current frame and bidirectional frames by using a neural network, estimating a motion between the current frame and the reference frame, obtaining a reconstructed motion by inputting the motion to a motion encoder and decoder, generating a set of temporal contexts based on the reconstructed motion and propagated feature, and compressing the current frame based on the temporal contexts by an inverse channel-wise entropy model which is adapted to reconstruct the relationship among channels such that the channels with less entropy are coded first and the channels with larger entropy are coded with the help of the previously coded channels.

In some embodiments, the step of generating the reference frame may include extracting features from the current frame and the bidirectional frames independently by using the neural network, the bidirectional frames including a previous reconstructed frame and a following reconstructed frame, obtaining distance values that represent feature similarity between the current frame and the bidirectional frames, and fusing the distance values along with the bidirectional frames to generate the reference frame.

In some embodiments, the step of obtaining distance values may further include conducting normalization subtraction and weighted averaging on the features.

In some embodiments, the step of extracting features may include extracting L layers feature stacks from the current frame, the previous reconstructed frame and the following reconstructed frame.

In some embodiments, the step of obtaining distance values may include, for each distance value, normalizing the L layers feature stacks from the current frame and the previous or following reconstructed frame, and subtracting the feature stacks in a channel dimension, scaling each channel and calculating an L2 norm distance, and averaging across spatial dimensions and all layers.

In some embodiments, the distance values may include a first distance value that represents feature similarity between the current frame and the previous reconstructed frame, and a second distance value that represents feature similarity between the current frame and the following reconstructed frame.

In some embodiments, the neural network may include a Siamese neural network.

In some embodiments, the inverse channel-wise entropy model may be adapted to predict beginning channel parameters with the help of deep channels such that larger entropy channels have more inputs.

In some embodiments, the inverse channel-wise entropy model may be adapted to inverse a predicted direction, which predicts the beginning channel parameters with the help of deep channels along with the direction of information accumulation.

In some embodiments, the inverse channel-wise entropy model may be adapted to divide an element to be coded into a plurality of groups (N) along with channels, where at least a first group ($1^{st}$) of beginning channels and a last group ($N^{th}$) of last channels are included, and to encode the last group first and take the last group parameters as an input of the next group (N−1$^{th}$) coding.

In some embodiments, the element to be coded may be divided into the plurality of groups unevenly across the channels.

In some embodiments, the first group may have the most significant entropy compared with the rest groups, and entropy distribution may be reduced from the first group to the last group.

In some embodiments, the first group of beginning channels may have the most inputs.

In some embodiments, the inverse channel-wise entropy model may be adapted to encode the first group based on all previous groups.

In some embodiments, the inverse channel-wise entropy model may be further adapted to obtain reconstructed groups corresponding to the plurality of groups and to merge the reconstructed groups to obtain a reconstructed element.

According to the second aspect of the invention, there is provided a system for learning-based bidirectional video compression, which includes one or more processors, and a memory storing one or more programs configured to be executed by the one or more processors, the one or more programs including instructions for performing or facilitating performing of the computer-implemented method as aforementioned.

According to the third aspect of the invention, there is provided a non-transitory computer readable medium having instructions stored thereon which, when executed by one or more processors, cause the one or more processors to execute the computer-implemented method as aforementioned.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

BRIEF DESCRIPTION OF DRAWINGS

Embodiments of the invention will now be described, by way of example, with reference to the accompanying drawings in which.

Figure 1:
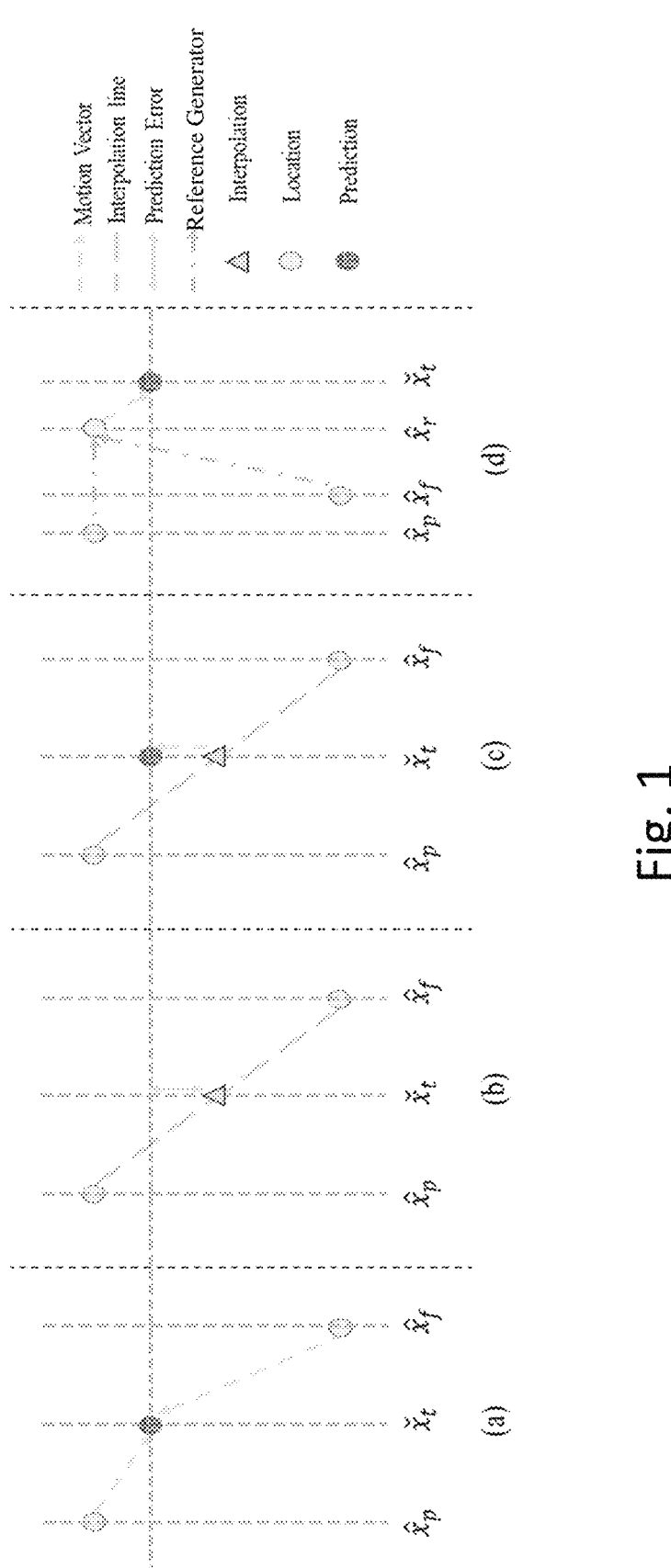
FIG. 1 shows several B-frame coding paradigms.

Before any embodiments of the invention are explained in detail, it is to be understood that the invention is not limited in its application to the details of embodiment and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Hereinafter, some embodiments of the invention will be described in detail with reference to the drawings.

Many approaches are explored to further improve the compression efficiency of the neural codec with bidirectional frames. Usually, there is a fixed hierarchical structure based on bidirectional flow and warping, or interpolation, assuming the motion is uniform for B-frame Coding. However, the first and last frames in a group of pictures (GOP) may contain a large motion, even different scenes.

In order to address the above issue, some embodiments of the invention introduce a pioneering learning-based approach for bidirectional-frame coding that employs a Siamese neural network. This method, while uncomplicated, has demonstrated efficacy. It incorporates two reference frames and the current frame to generate a single reference frame, which is then used for the P-frame model to predict the current frame. Specifically, the Siamese neural network is leveraged to independently extract features from the current frame and bidirectional frames (B frames). In other words, the features of the previous frame, current frame, and future frame are extracted independently. Following normalization subtraction and weighted averaging, two distance values that represent the feature similarity between frames are obtained. The two distance values include the value for features of the current frame and the previous frame, and the other value for the current frame and the future frame. These two distance values, along with the bidirectional frames (the previous and future frames), are introduced into the sophisticated fusion module to yield the single reference frame. The conditional coding paradigm (for example, conditional P-frame coding paradigm) is then applied to this single reference frame for the compression of the current frame.

Some embodiments of the invention are proposed for extending neural P-frame coding for B-frame learned video compression with the Siamese neural network to significantly improve compression performance, which can be utilized in video delivery applications and storage systems.

In addition, the entropy model is another critical component, and many entropy methods have been proposed for neural video compression. Autoregressive entropy model [11] and checkerboard entropy model [12] have been proposed to reduce spatial redundancy. Moreover, Li et al. [13] propose hybrid spatial-temporal entropy modeling with binary tree-based channel partition for neural video compression (DCVC-HEM). Furthermore, to increase spatial context diversity, Li et al. [14] redesign a quadtree-based channel partition for the entropy model (DCVC-DC). Channels are treated equally in the above designs [13], [14]. However, the entropy distribution among channels is not even, and the beginning channels contain the larger entropy [15]. Considering those previous studies, some embodiments of the invention propose an inverse channel-wise entropy model for video compression with consideration of uneven entropy distribution among channels. In detail, considering that the beginning channels contain larger entropy [15], some embodiments of the invention propose to predict the beginning channels with the help of deep channels' parameters. In this way, larger entropy channels have more inputs as references and better performance is obtained.

Some embodiments of the invention are proposed for the entropy model of learned video compression to significantly improve compression performance, which can be utilized in video delivery applications and storage systems.

In conclusion, some embodiments of the invention extend the predicted frame coding to the bidirectional frame coding and propose a learning-based bidirectional framework for learned video compression, which obtains better compression efficiency. Some technical effects achieved by the proposed method according to some embodiments are as follows:

(i) The proposed method proposes extending neural predicted frame coding to a bidirectional frame coding framework with the Siamese neural network. Particularly, the proposed method obtains two distance values, which indicate the similarity of frames. Then, the proposed method fuses the distance values and reference frames to generate a single reference frame.

(ii) The proposed method further designs an inverse channel-wise entropy model to improve the bidirectional framework's compression efficiency. Unlike the entropy models, which treat the channels equally, the proposed method considers entropy distribution among channels and proposes to predict the beginning channels with the help of deep channels.

(iii) Experiment results demonstrate the validity and correctness of the proposed method. Compared with the VTM LDB configuration, the proposed method outperforms it with 11.29%/54.34% in terms of PSNR/MS-SSIM. Furthermore, the superiority of the proposed method is more pronounced as the group of pictures size is larger.

Next, learned image compression and learned video compression that are related to some embodiments of the invention are introduced.

A. Learned Image Compression

End-to-end optimized learned image compression approaches have developed rapidly during the last few years. Balle' et al. [17] propose the first end-to-end image compression method and optimize it with a single rate-distortion cost function. The image is transformed into latent code with the non-linear neural network, quantized, and written into a bitstream. Subsequently, after observing that there is spatial redundancy in latent code, Balle' et al. [18] propose to transform the latent code into hyperspace to obtain a scale hyperprior for compression condition. This way, the redundancy among latent is removed, and the compression efficiency is improved. Along with the above mind, the autoregressive entropy model with a mask CNN [11] is proposed to mine the relationship among neighborhood pixels and further improve the compression efficiency. Furthermore, Chen et al. propose to apply non-local attention for learned image compression [19]. Cheng et al. [20] parameterize the latent with Gaussian Mixture Likelihoods, achieving a comparable performance with VVC.

B. Learned Video Compression

Learned video compression is developed in [21]. Lu et al. [3] propose the first end-to-end video compression method. It utilizes optical flow [22] to predict the motion and obtain the residue of the predicted frame. Subsequently, many works follow the residual coding paradigm, and modules are proposed for better performance. For example, Hu et al. [23] present adaptive resolution optical flow for video compression. Guo et al. [24] introduce an enhanced motion compensation technique to obtain a better-predicted frame. Moreover, cross-scale weighted prediction with multi-head warping is proposed for diverse motion cases in [25]. In addition, a temporal context-based framework with reference aggregation is proposed to obtain a more accurate reference in [26]. Furthermore, optical flow estimation in scale space [27] is proposed to handle complex situations, such as disocclusions and fast motion.

The residual coding paradigm creates a predicted frame as the context and employs subtraction to eliminate redundancy. In comparison, conditional coding exhibits greater potential [5] in the entropy model. Therefore, Li et al. [5] transition from residual coding to a conditional paradigm, leading to the proposal of Deep Contextual Video Compression (DCVC). Within DCVC, a feature context is generated as a condition for the compression of the current frame. Subsequently, Sheng et al. [28] propose multi-scale context and feature propagation to boost the performance of DCVC. Guo et al. [29] propose enhanced context mining and filtering for the conditional paradigm. Wang et al. [30] exploit both long and short-range temporal relationships to boost compression performance. Li et al. [13] design a spatial-temporal entropy model with a multi-granularity quantization mechanism. Additionally, Li et al. [14] pioneer the use of diverse contexts as the condition for compression, an approach that achieved state-of-the-art (SOTA) results.

In addition to the above single-direction learned video compression, bidirectional video compression is also explored [6]-[9]. However, the reported results show that those bidirectional video compression approaches with relative success in video coding still do not surpass the single-direction reference codec DCVC-DC [14]. Described next are some embodiments of the invention which propose a bidirectional framework for learned video compression, which outperforms the DCVC-DC.

I. Embodiments

A. The Overall Framework

Compared with P-frame coding, B-frame coding provides more information, leading to better compression efficiency. There are several B-frame coding paradigms. At the early stage, two motion vectors are estimated and transmitted for bidirectional coding [7]. Subsequently, interpolation is applied, and the interpolated frame is treated as the predicted frame [31]. In this way, no motion information is needed to be transmitted. However, the coding performance could be improved with motion information. Therefore, the interpolated frame is taken as the input of P-frame coding and is corrected using a motion vector in [9]. Some embodiments of the invention include generating the reference frame rather than interpolating and taking the generated reference frame as the input of P-frame coding. FIG. 1 shows the above mentioned B-frame coding paradigms. $\hat{x}_p$, $\hat{x}_f$, and $\hat{x}_I$ denote the previous reference frame, the future reference frame and the predicted frame. $\hat{x}_r$ represents the generated reference frame. In FIG. 1, (a) shows B-frame prediction based on bidirectional flow/warp in which two motion vectors with respect to two references are estimated and transmitted. In (b) of FIG. 1, interpolation is applied, and the interpolated frame is treated as the predicted frame. No motion information is needed to be transmitted. FIG. 1, (c) shows B-frame prediction in which the interpolated frame is taken as the input of P-frame coding and is corrected with a unidirectional motion vector. FIG. 1, (d) shows B-frame prediction according to some embodiments of the invention in which a reference frame is generated and the generated frame result is corrected using a unidirectional motion vector. The generated reference frame is taken as an input of P-frame coding.

Figure 2:
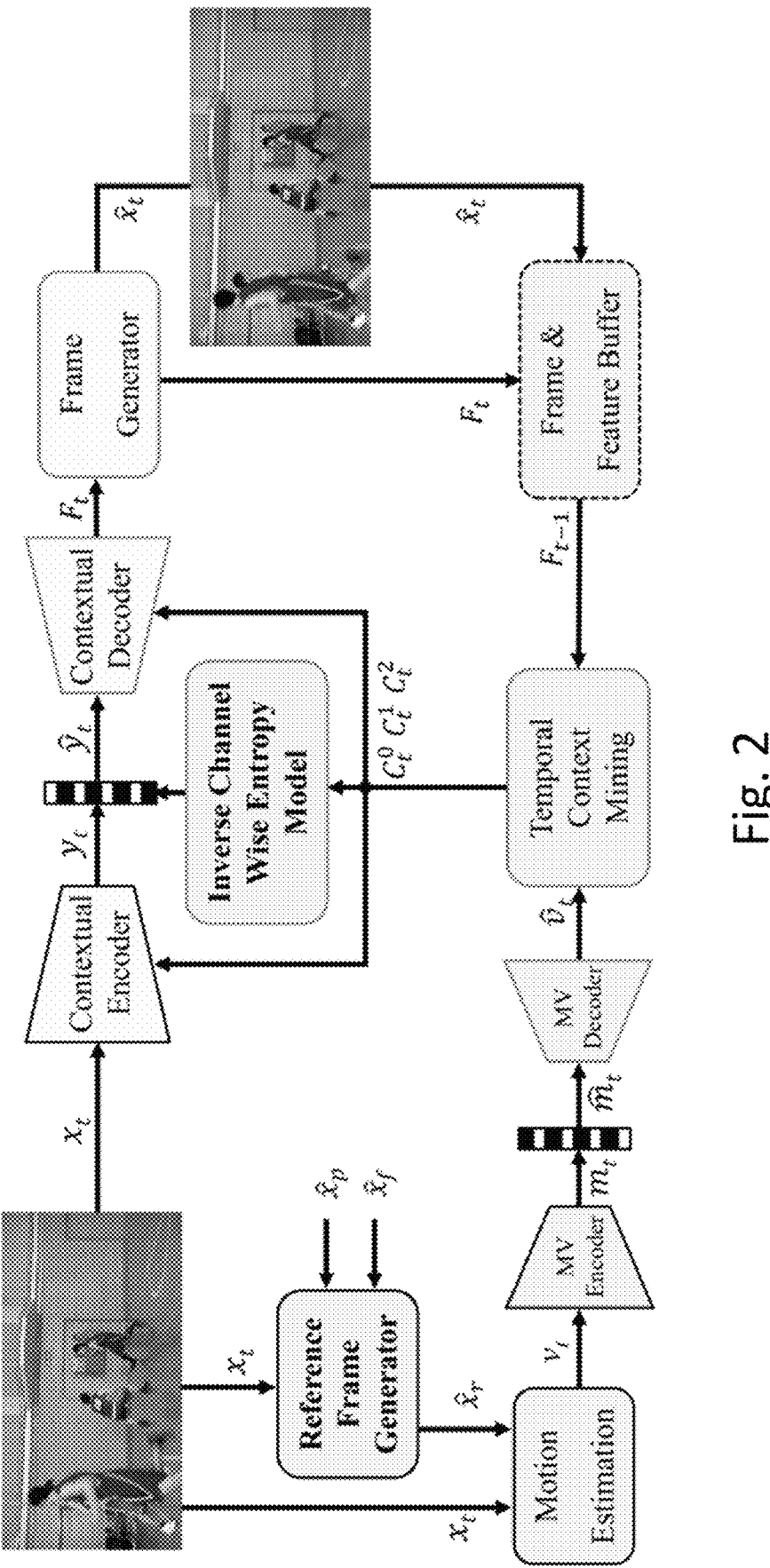
FIG. 2 shows a whole framework of a B-frame coding method according to some embodiments of the invention.

The whole framework of the B-frame coding method according to some embodiments of the invention is depicted in FIG. 2, and the whole pipeline is as follows. Given an input frame $x_t$ (i.e., a current frame to be compressed), a reconstructed frame $\hat{x}_t$ is obtained with rate-distortion (RD) cost as little as possible. Some embodiments of the invention take advantage of bidirectional reconstructed frames, i.e., a previous reconstructed frame $\hat{x}_p$ and a future reconstructed frame $\hat{x}_f$. Their deep features distance with $x_t$ are measured and a reference frame $\hat{x}_r$ is obtained with a reference frame generator. With the current frame $x_t$, the previous reconstructed frame $\hat{x}_p$ and the future reconstructed frame $\hat{x}_f$, the reference frame $\hat{x}_r$ is generated with the proposed reference frame generator. A motion $v_t$ between $x_t$ and $\hat{x}_r$ is estimated with an optical flow spatial pyramid network (Spynet) [22]. After the motion $v_t$ is fed into a motion encoder and decoder, a reconstructed motion $\hat{v}_t$ is obtained. That is, the motion $v_t$ is compressed and reconstructed to the reconstructed motion $\hat{v}_t$ with the MV encoder and decoder. Taking the reconstructed motion $\hat{v}_t$ and propagated feature $F_{t-1}$ as input, a temporal context mining generates a set of temporal contexts $C_t^0, C_t^1, C_t^2$. Then, the temporal contexts are taken as inputs to compress the current frame $x_t$ with a contextual encoder-decoder and to obtain a decoded feature $F_t$. Finally, a decoded frame $\hat{x}_t$ is generated from $F_t$ with a frame generator. $m_t$ and $y_t$ are latent representations. $\hat{m}_t$ and $\hat{y}_t$ denote their respective quantized variables, separately. $F_t$ is the feature of the current frame and is converted to reconstructed frame $\hat{x}_t$ through the frame generator. The $F_t$ and $\hat{x}_t$ are restored in the buffer for reference.

The proposed framework builds upon the foundations of DCVC-TCM [28]. However, in contrast to DCVC-TCM, the proposed approach introduces the use of a Siamese neural network to generate a reference frame from bidirectional frames. Moreover, considering entropy distribution among channels, some embodiments of the invention design a new entropy model for learned video compression and propose inverse channel-wise modeling to improve the compression efficiency further. The reference frame generator will be discussed in I-B, and the details of the newly designed entropy model are illustrated in I-C. Moreover, the loss function and Group of Pictures (GOP) settings will be demonstrated in I-D and I-E, respectively.

B. Reference Frame Generation

Figure 3:
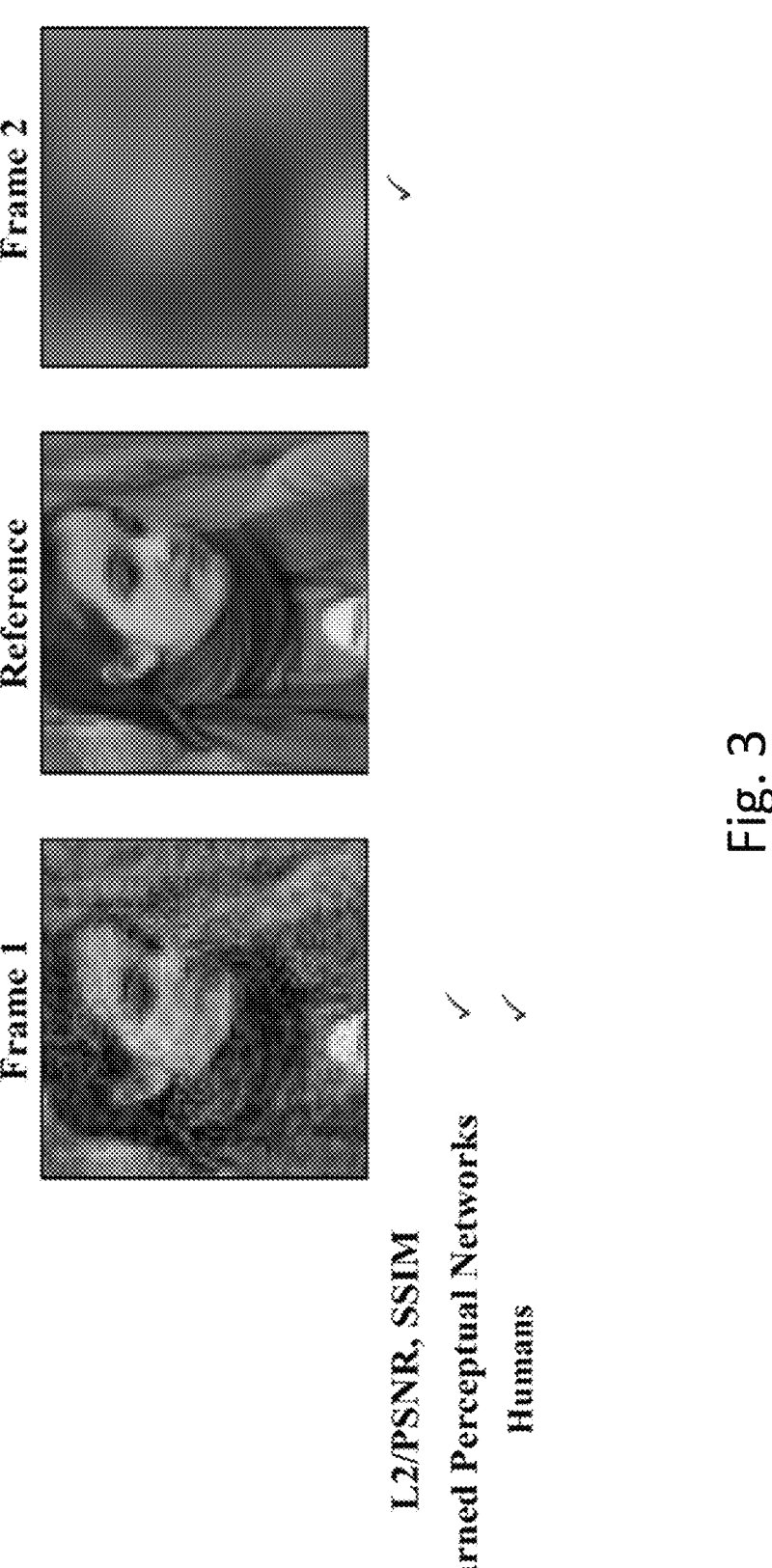
FIG. 3 shows a comparison among some methods for measuring a feature distance.

For the learning-based bidirectional video compression, either a fixed hierarchical structure with uniform motion assumption or interpolation is applied in previous works [7]-[9]. While motion vectors are typically not uniformly distributed in real-world scenarios, the predicted frames from B frames contain a wealth of information. Some embodiments of the invention include creating a reference frame by assessing the feature distance between the bidirectional frames (B frames) and the current frames. This way, a reference frame with better quality can be obtained and a higher compression ratio can be achieved. First, proposed methods for measuring distance are provided, as illustrated in FIG. 3. The traditional metrics (PSNR/MS-SSIM) disagree with humans' judgment when the frame has a gap with reference. In contrast, the learned perceptual networks demonstrate the same observation as humans.

Therefore, some embodiments of the invention include applying a learning-based neural network to predict the reference frame with bidirectional reconstructed frames and the current frame rather than using traditional metrics directly.

Figure 4:
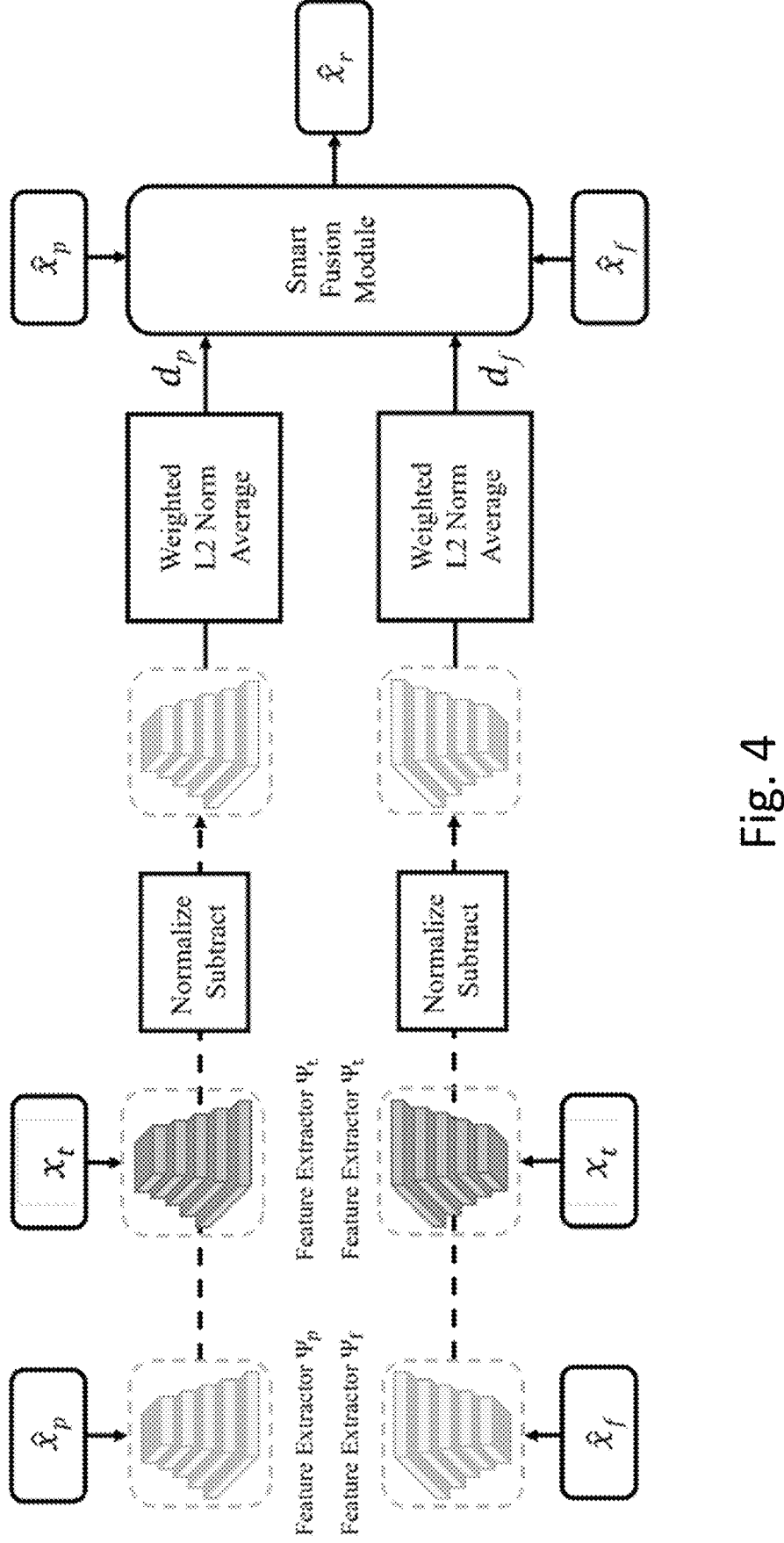
FIG. 4 shows a framework of generating a reference frame according to some embodiments of the invention.

Considering the aforementioned factors, some embodiments of the invention involve generating a reference frame based on feature similarity, instead of interpolating between the bidirectional frames, as depicted in FIG. 4. FIG. 4 shows a framework of generating reference frame according to some embodiments of the invention. $x_t$ is a current frame. $\hat{x}_p$ and $\hat{x}_f$ are reconstructed bidirectional frames. $d_p$ is the distance between $x_t$ and $\hat{x}_p$. $d_f$ is the distance between $x_t$ and $\hat{x}_f$. $\hat{x}_r$ is the generated reference frame. Given a neural network, the proposed framework extracts the features of frames and normalizes the activation in the channel dimension, then the framework scales each channel and calculates the L2 norm distance. Next, the framework averages across spatial dimensions and all layers to obtain $d_p$ and $d_f$. Finally, the framework feeds the distance values and corresponding frames into the smart fusion module, generating the reference frame $\hat{x}_r$. With reference to the learned perceptual image patch similarity (LIPIPS) structure [32], some embodiments of the invention propose to obtain the feature distance $d_p$ and $d_f$ first and then generate the reference frame $\hat{x}_r$. In detail, a Siamese neural network is designed with the same weights shared to generate distance values $d_p$ and $d_f$. $d_p$ is the distance between $x_t$ and $\hat{x}_p$. $d_f$ is the distance between $x_t$ and $\hat{x}_f$. Taking the distance value $d_p$ as an example, the L layers feature stacks $\varphi_p$ and $\varphi_t$ are extracted from the previous reconstructed frame $\hat{x}_p$ and the current frame $x_t$. Then, the L layers feature stacks $\varphi_p$ and $\varphi_t$ are normalized and the two feature stacks are subtracted along the channel dimension. Subsequently, the subtracted feature stack is scaled using a weight vector and the L2 distance is calculated. Finally, some embodiments of the invention spatially average and sum channel-wise to determine the feature distance denoted as $d_p$. The distance value $d_f$ can be obtained in the same way. If $d_p$ is larger than $d_f$, we take $\hat{x}_f$ as the reference frame $\hat{x}_r$ and vice versa. The whole process of reference frame generation is formulated as follows:

$$d_p = \sum_l \frac{1}{H_l W_l} \sum_{h,w} \left\| w_l \odot \left( \varphi_p^l - \varphi_t^l \right) \right\|_2^2 \tag{1}$$

$$d_f = \sum_l \frac{1}{H_l W_l} \sum_{h,w} \left\| w_l \odot \left( \varphi_f^l - \varphi_t^l \right) \right\|_2^2 \tag{2}$$

$$= M \times \hat{x}_p + (1-M) \times \hat{x}_f \left\{ \begin{matrix} \text{if } d_p > d_f, & M = 0 \\ \text{if } d_p \le d_f, & M = 1 \end{matrix} \right\} \tag{3}$$

where $\odot$ represents element-wise multiplication, l is the layer number of feature stack, $H_l$ and $W_l$ are corresponding height and width of the feature layer, $w^l$ is the scale vector along channel. Moreover, the feature extractor is implemented with AlexNet as the backbone.

Furthermore, traditional metrics PSNR/MSSSIM are also applied for the backbone of the proposed reference frame generation to demonstrate the performance comparison in II-E ablation study. The performance comparison results validate the correctness of the proposed reference frame generation design.

The proposed reference frame generator model is play and plug, which can be extended to another learning-based video compression. Unlike other B-frame coding methods, which assume the motion between the previous and feature frame is uniform, the proposed method takes advantage of the deep features of the previous and future frames to generate the reference frame.

C. Inverse Channel-Wise Entropy Model

Considering energy and entropy distribution along channels [15], it is observed that beginning channels occupy most of the entropy. Since the entropy distribution correlates to the energy distribution, it indicates an information compaction property. However, even in the previous SOTA-learned video compression method DCVC-DC, the channels are treated equally regardless of the information property.

Figure 5:
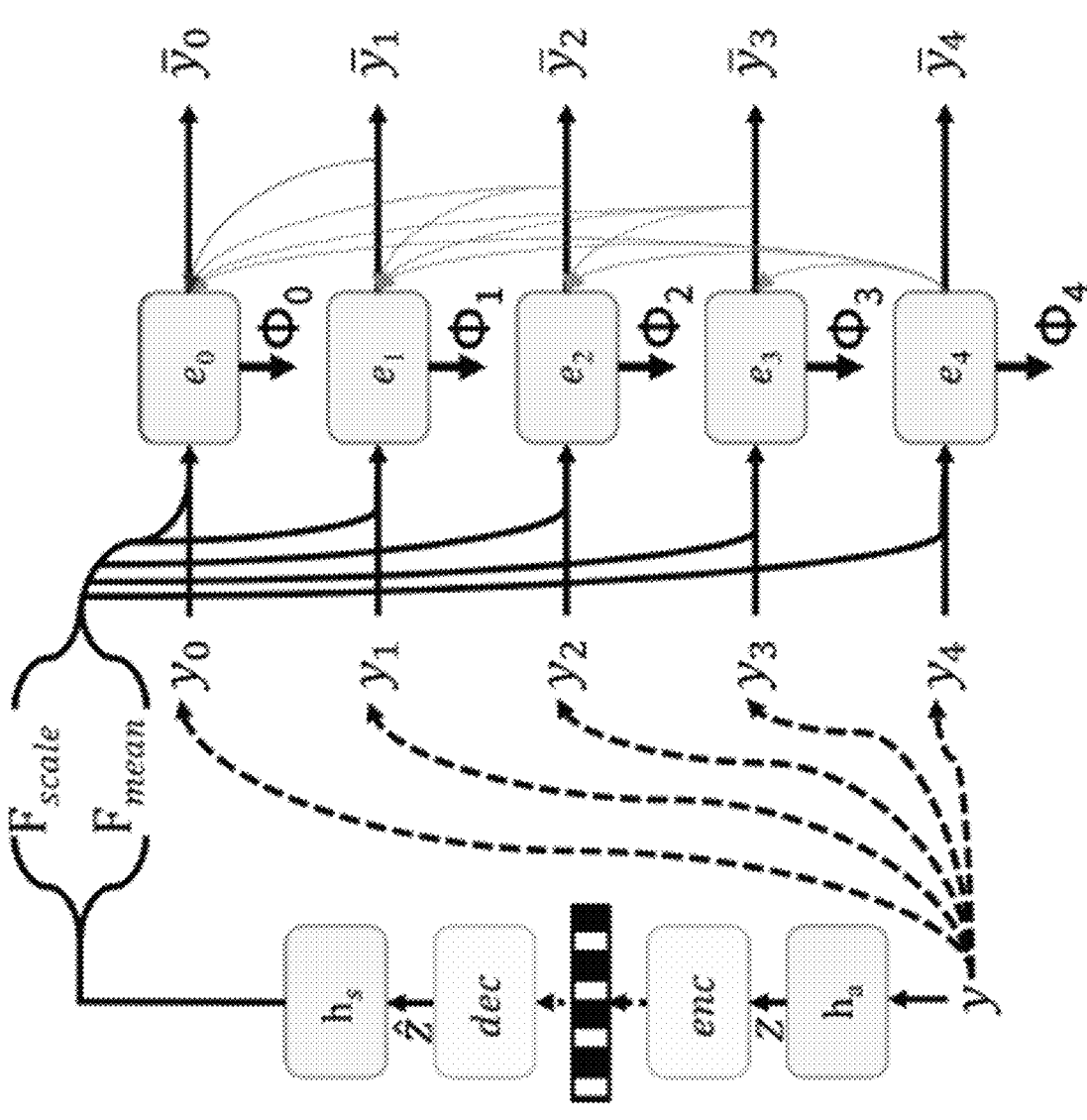
FIG. 5 shows an inverse channel-wise entropy model according to some embodiments of the invention.
Figure 6:
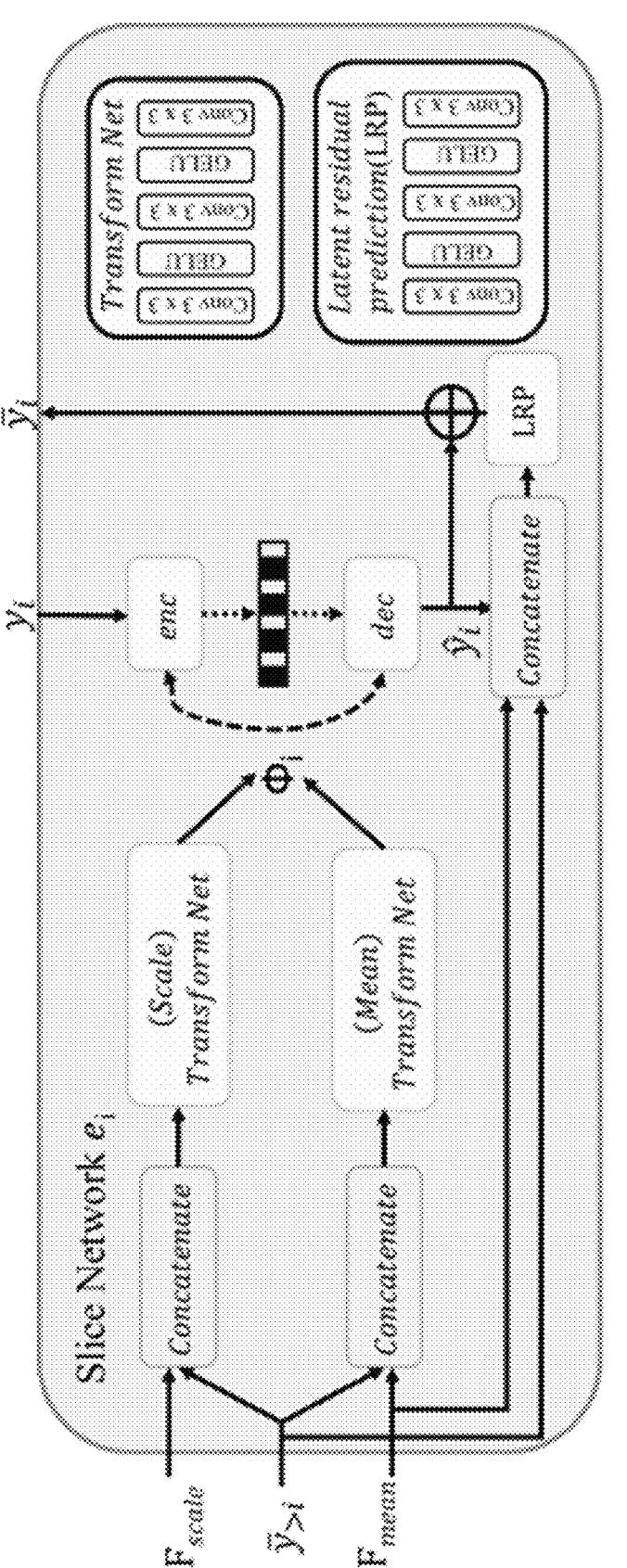
FIG. 6 illustrates details of slice network according to some embodiments of the invention.

As one of the learned image compression schemes, an unevenly grouped scheme is proposed in where the last group with the most negligible entropy energy has the maximum inputs. However, the channel with more significant entropy energy should have more inputs. Therefore, some embodiments of the invention propose an inverse channel-wise entropy model to predict beginning channel entropy parameters, as shown in FIG. 5 and FIG. 6. The symbol y is to be encoded, and y is divided into five groups $(y_0, y_1, y_2, y_3, y_4)$ along with channels, where $y_0$ is the group of beginning channels, and $y_4$ is the group of last channels. According to the previous analysis, $y_0$ has the most significant entropy compared with $y_1$, $y_2$, $y_3$, and $y_4$. Some embodiments of the invention propose to encode the $y_4$ group first and take advantage of the $y_4$ parameters as an input of the $y_3$ group coding. In such a way, the $y_0$ group is encoded based on all previous groups. Finally, the reconstructed groups $\bar{y}_0$, $\bar{y}_1$, $\bar{y}_2$, $\bar{y}_3$, $\bar{y}_4$. are obtained and they are merged to get whole reconstructed $\hat{y}$.

The entropy model is critical in the whole framework, and many methods have been proposed. For example, the autoregressive entropy model is applied in [5], which shows high compression efficiency but is time-consuming. Moreover, to make the decoding processes faster, the factorized entropy model is directly applied to model the latent representations in DCVC-TCM [28]. Subsequently, more well-designed entropy models are proposed for learned video compression in DCVC-HEM [13] and DCVC-DC [14], which treat the channels equally. However, it is reported [15] that the entropy distribution among channels is not even, and the beginning channels contain larger entropy. Based on the above situation, some embodiments of the invention propose a new entropy model for video compression with consideration of the uneven distribution among channels. He et al. [15] design to divide the channels manually into uneven groups for learned image compression, and the beginning group contains fewer channels. With the unevenly grouped channels, the entropy distribution is more even among groups and has shown better compression efficiency. It is observed that the channels' parameters would be fed into the following channels as a condition to reduce the following channel redundancy, which indicates that the following channels have more references than previous channels. However, it is believed that the channel with a larger entropy shall have more inputs as references. Therefore, some embodiments of the invention remodel the relationship among channels and propose an inverse channel-wise entropy model to inverse the predicted direction, which predicts the beginning channel parameters with the help of deep channels along with the direction of information accumulation. FIG. 5 depicts the details of the proposed inverse channel-wise entropy model according to some embodiments of the invention. y is to be coded and fed into hyperprior network $h_a$ and $h_s$ to obtain the global scale $F_{scale}$ and global mean $F_{mean}$. z is the side information of y and $\hat{z}$ is the reconstructed side information. The y is split into groups $y_0, y_1, y_2, y_3, y_4$. $\Phi_0, \Phi_1, \Phi_2, \Phi_3, \Phi_4$ are the scale and mean of corresponding groups. As the group $y_4$ contains less entropy, $y_4$ is coded first to $\bar{y}_4$. Subsequently, $y_3$ is coded with the help of $\bar{y}_4$. $F_{scale}$ and $F_{mean}$. $\bar{y}_2$, $\bar{y}_1$, $\bar{y}_0$ are coded one by one. Finally, they are merged to get a whole reconstructed $\hat{y}$. The whole process is formulated as follows:

$$z = h_a(y), \hat{z} = Q(z), \tag{4}$$

$$\mathcal{F}_{mean}, \mathcal{F}_{scale} = h_s(\hat{z}), \tag{5}$$

$$r_i, \Phi_i = e_i(\mathcal{F}_{mean}, \mathcal{F}_{scale}, \bar{y}_{>i}, y_i), 0 <= i < s, \tag{6}$$

$$\bar{y}_i = r_i + \hat{y}_i. \tag{7}$$

where $h_a$ is the hyper-prior encoder, z is the side information to capture the spatial dependencies of element y. Q represents quantization, and $\hat{z}$ is the quantized side information. $h_s$ denotes the hyper-prior decoder to generate two global latent $F_{scale}$ and $F_{mean}$, which serve as inputs for the subsequent slice network $e_i$, as depicted in FIG. 6. FIG. 6 illustrates the details of slice network in which the slice $\bar{y}_{>i}$ are applied to encode the subsequent slice. Subsequently, $y_i$ is processed to $\bar{y}_i$ sequentially. $\Phi_i=(\mu_i,\sigma_i)$ is the estimated distribution parameters, which are applied to help generate the bitstream. Meanwhile, $r_i$ is introduced to minimize the quantization errors $(y-\hat{y})$. Therefore, the $\bar{y}_i$ with less error is obtained, and we merge them to $\hat{y}$. The hyper-prior encoder $h_a$ and decoder $h_s$ can be set the same as DCVC-TCM [28].

D. Loss Function

The entire framework is optimized with the single rate-distortion (R-D) function:

$$L = \lambda D + R = \lambda d(x, \hat{x}) + R^{\hat{v}} + R^{\hat{f}} \tag{8}$$

where L is the whole loss, and $d(x, \hat{x})$ is the distortion between the input frame x and the reconstructed frame $\hat{x}$. The distortion is evaluated using Mean Square Error (MSE) or Multi-Scale Structural Similarity (MS-SSIM). The term $R^{\hat{v}}$ represents the bits consumed for encoding the quantized motion vector latent variables and their corresponding priors. Meanwhile, $R^{\hat{f}}$ represents the bits used for encoding the quantized contextual latent variables and their corresponding priors. The $\lambda$ parameter controls the balance between the rate R and the distortion D.

E. GOP Structure

Figure 7:
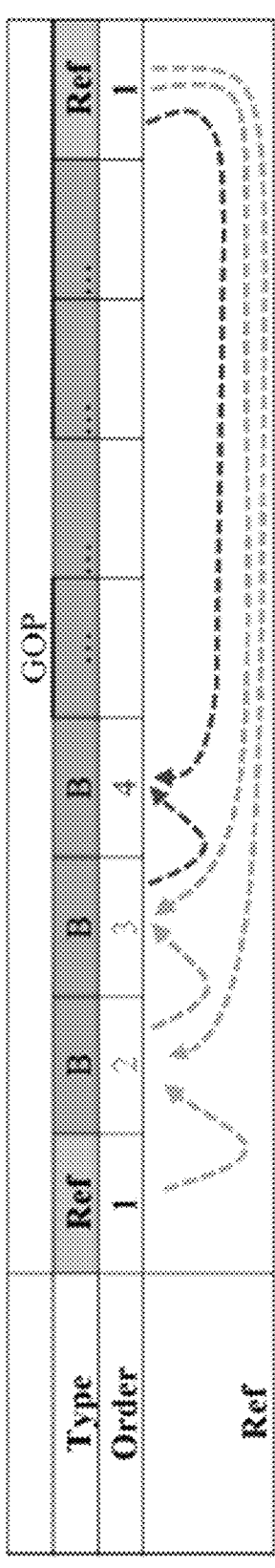
FIG. 7 shows Group of Pictures (GOP) structure settings according to some embodiments of the invention.
Figure 8A:
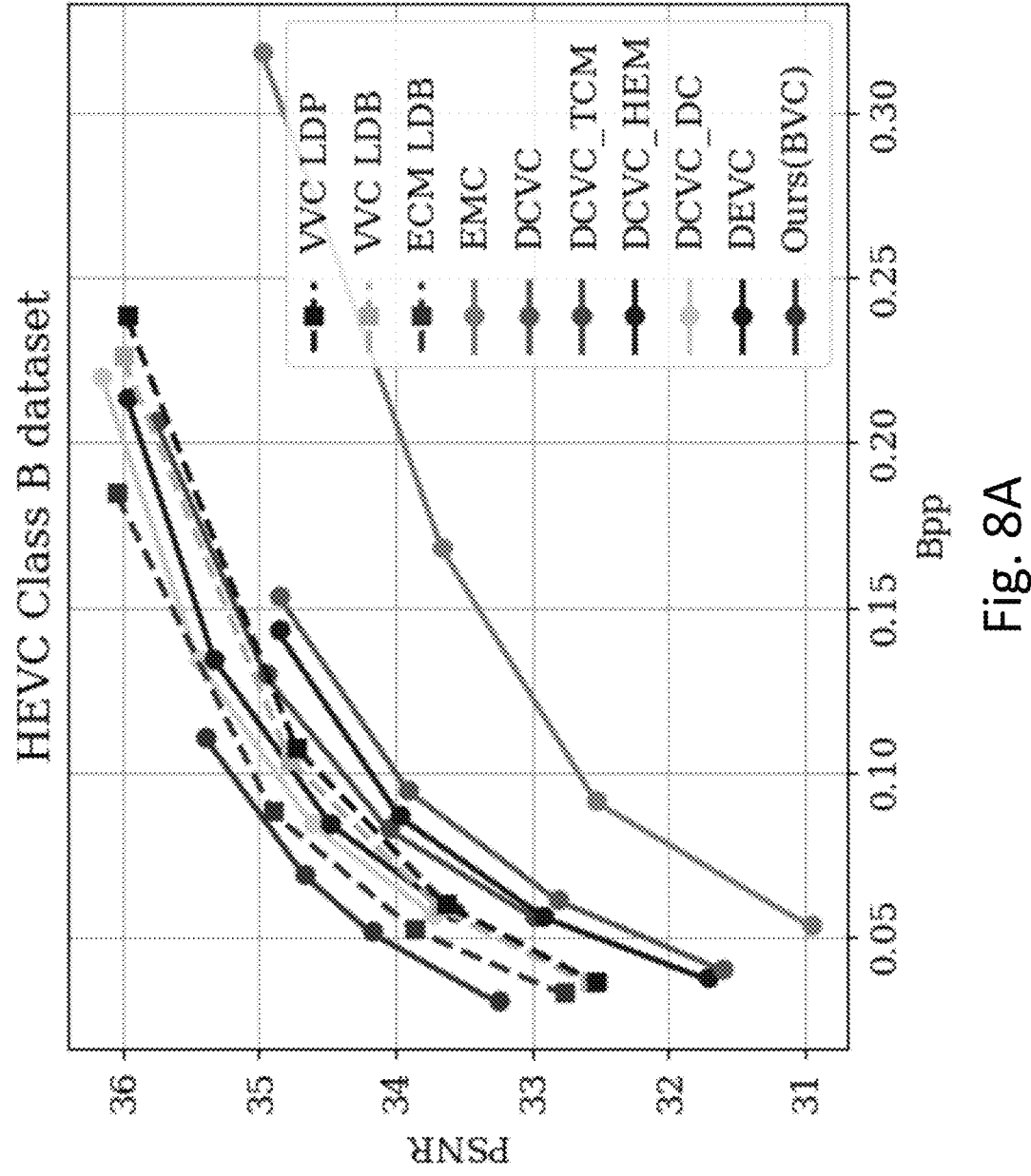
FIGS. 8A to 8F present the Rate-Distortion (RD) curves for PSNR performance comparison.
Figure 8B:
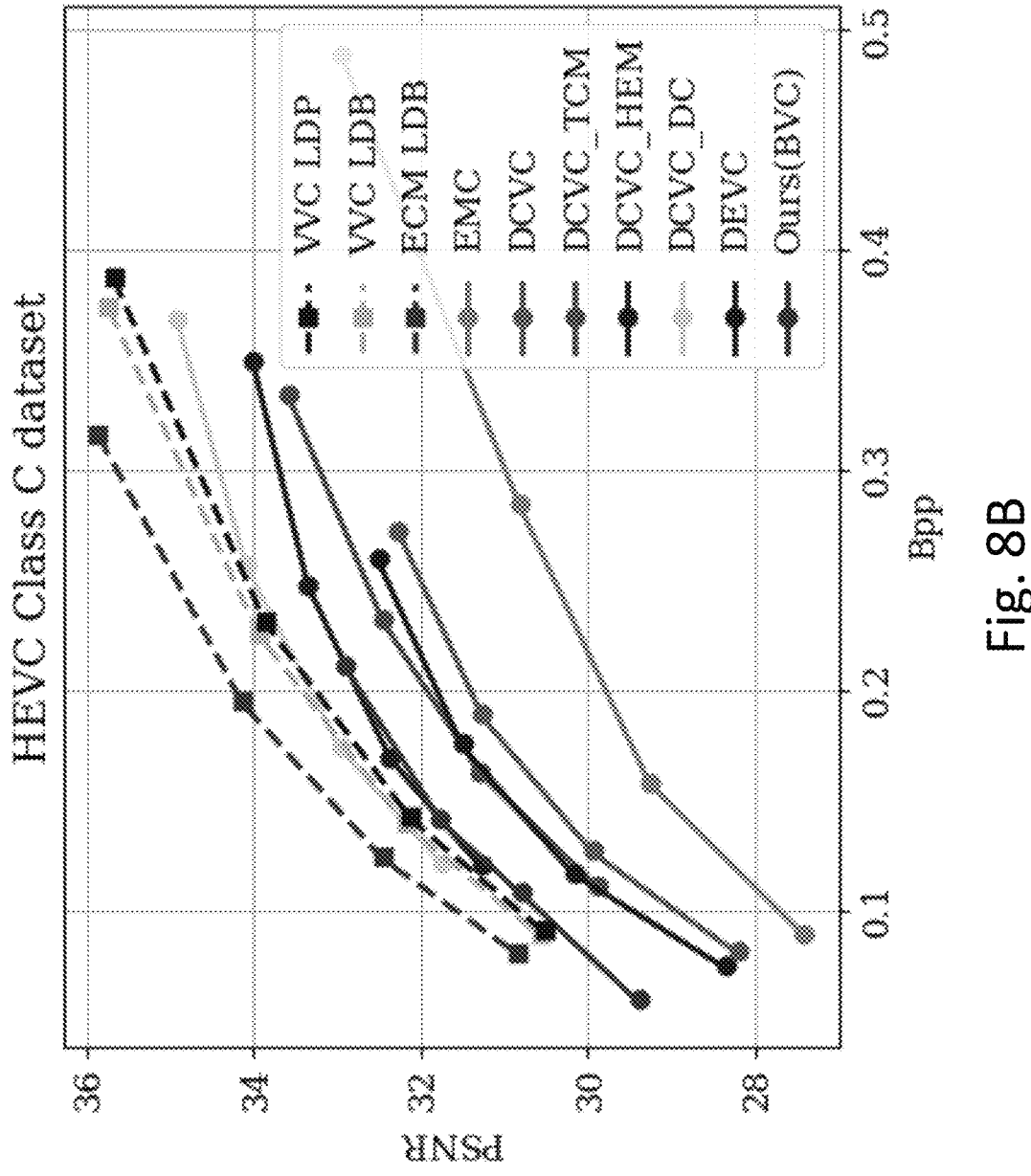
Figure 8C:
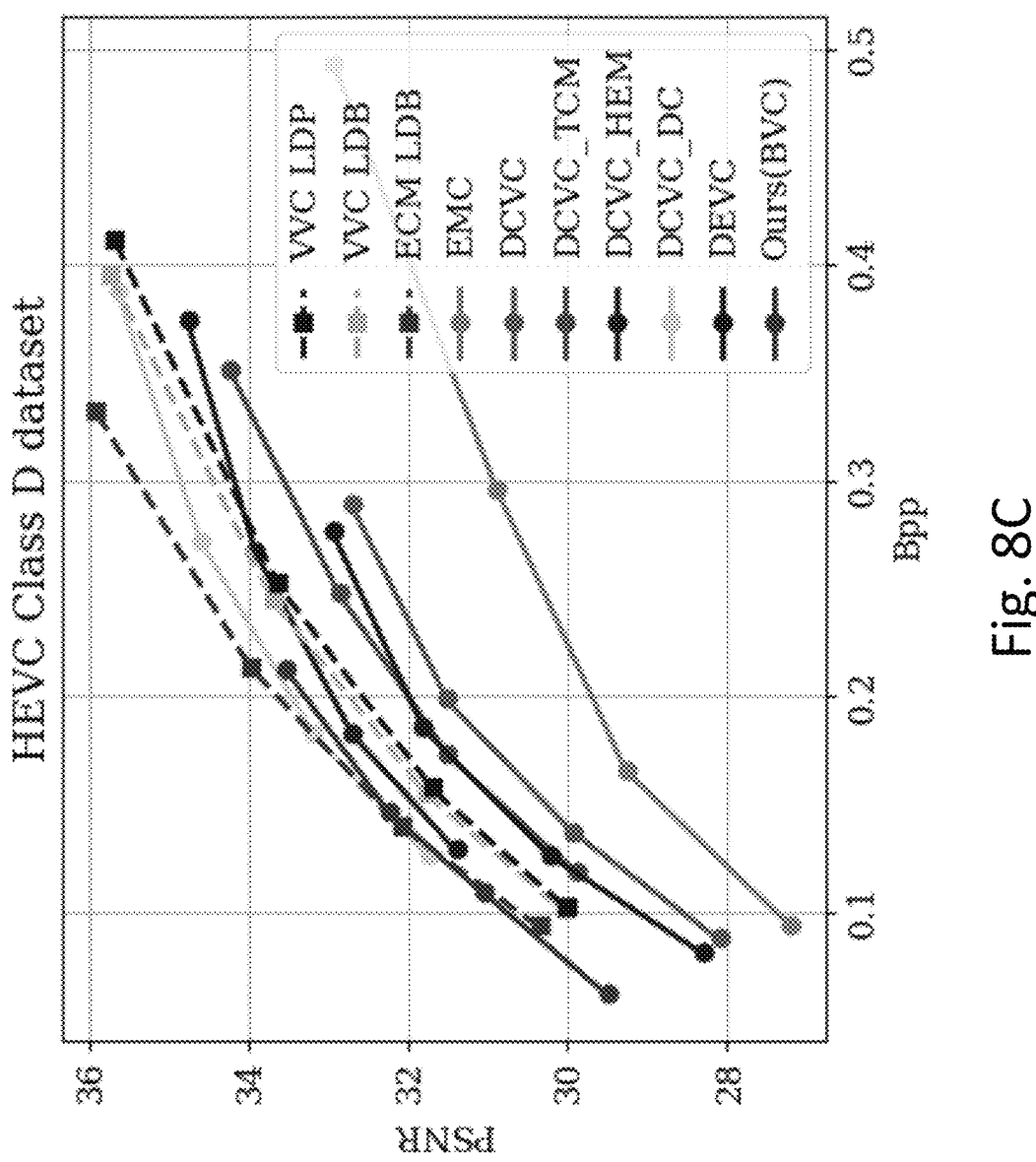
Figure 8D:
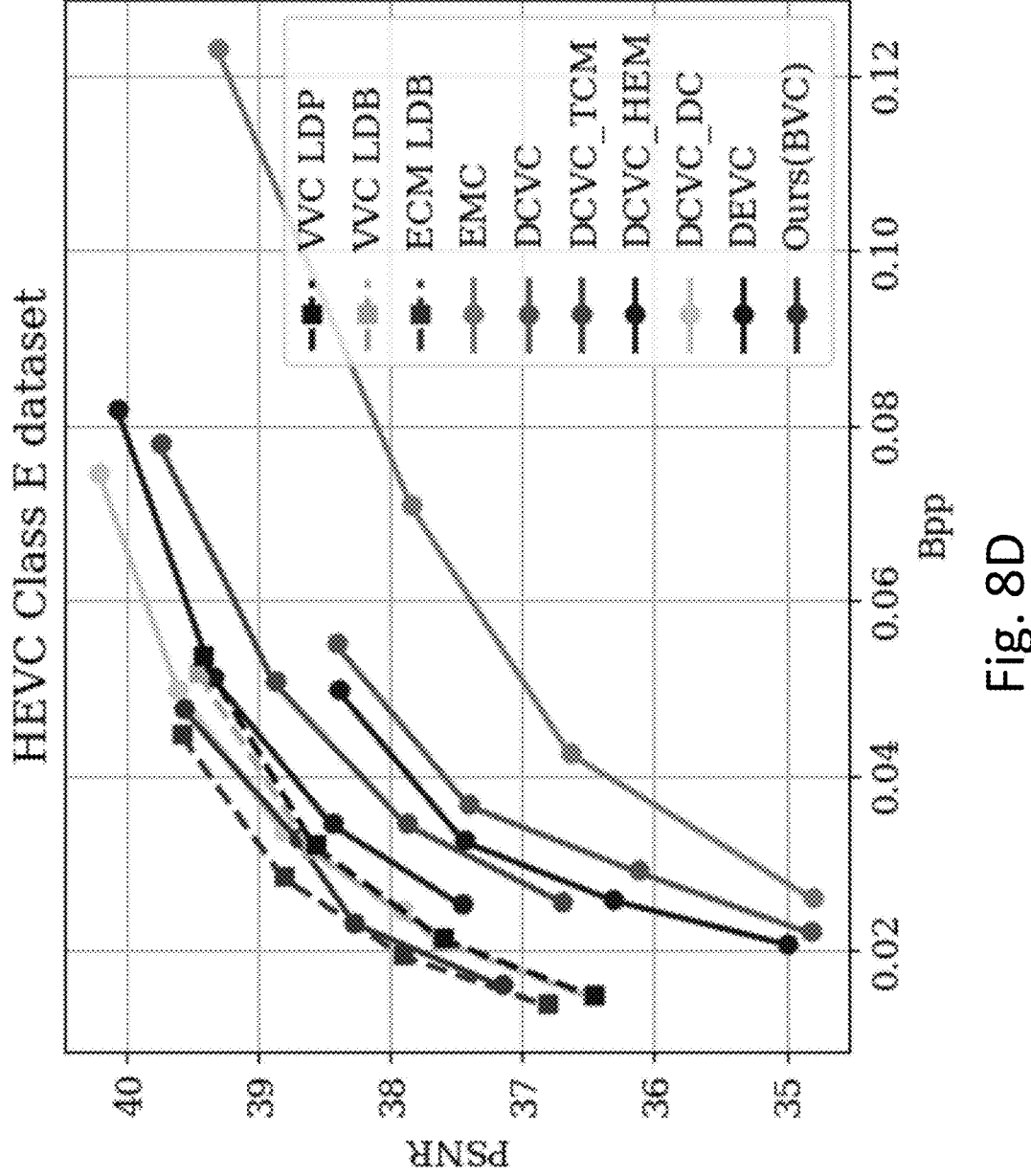
Figure 8E:
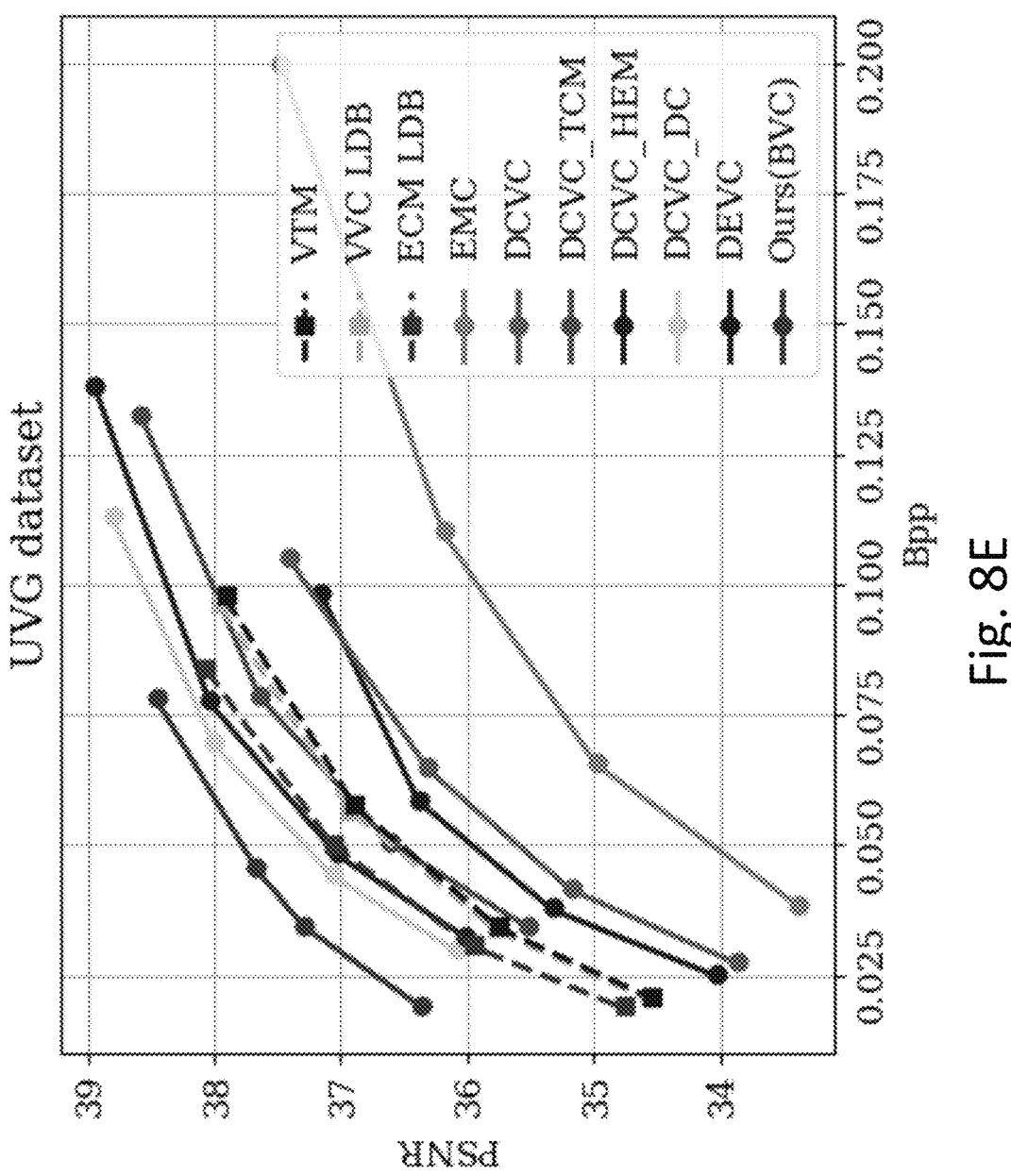
Figure 8F:
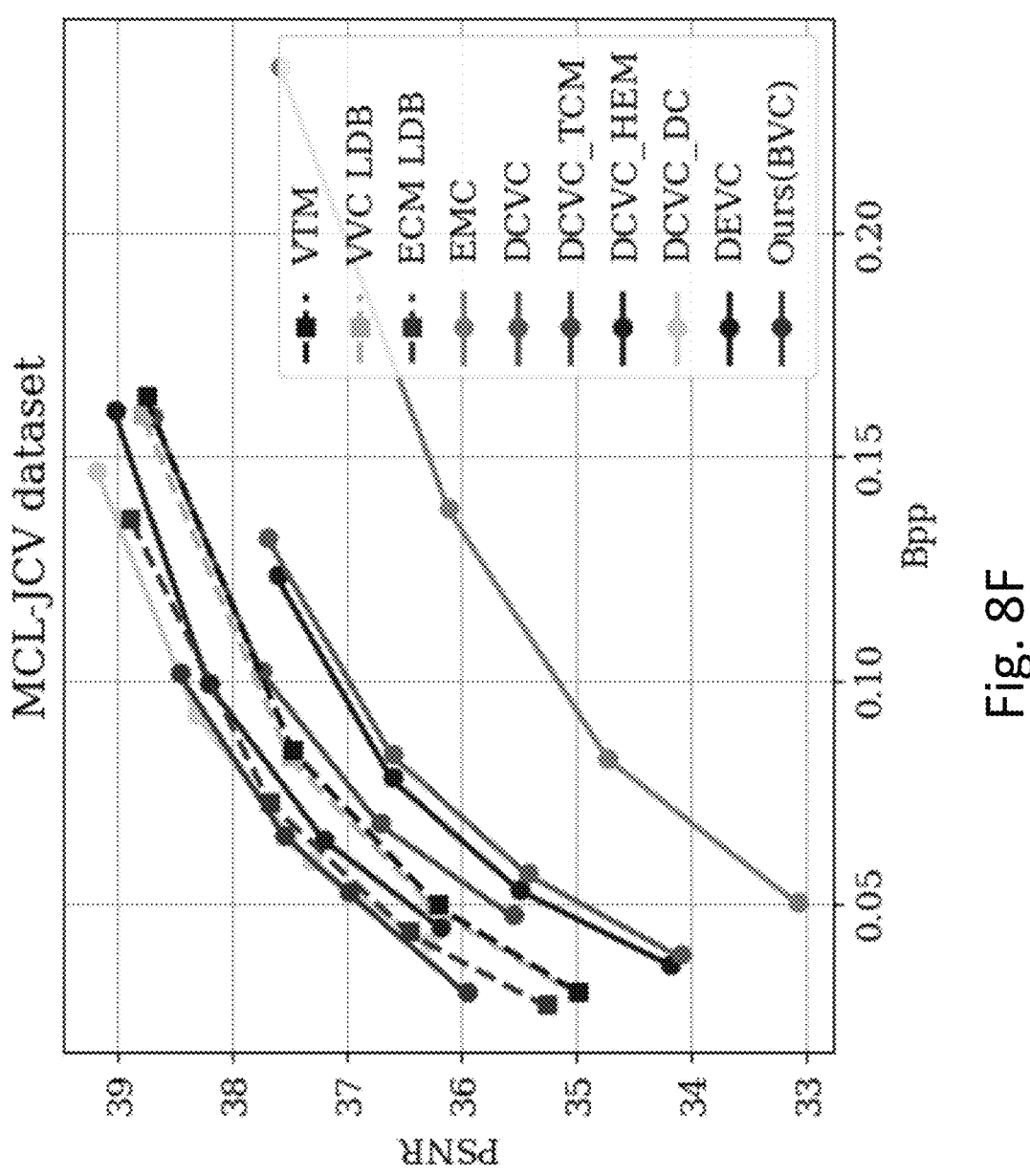
Figure 9A:
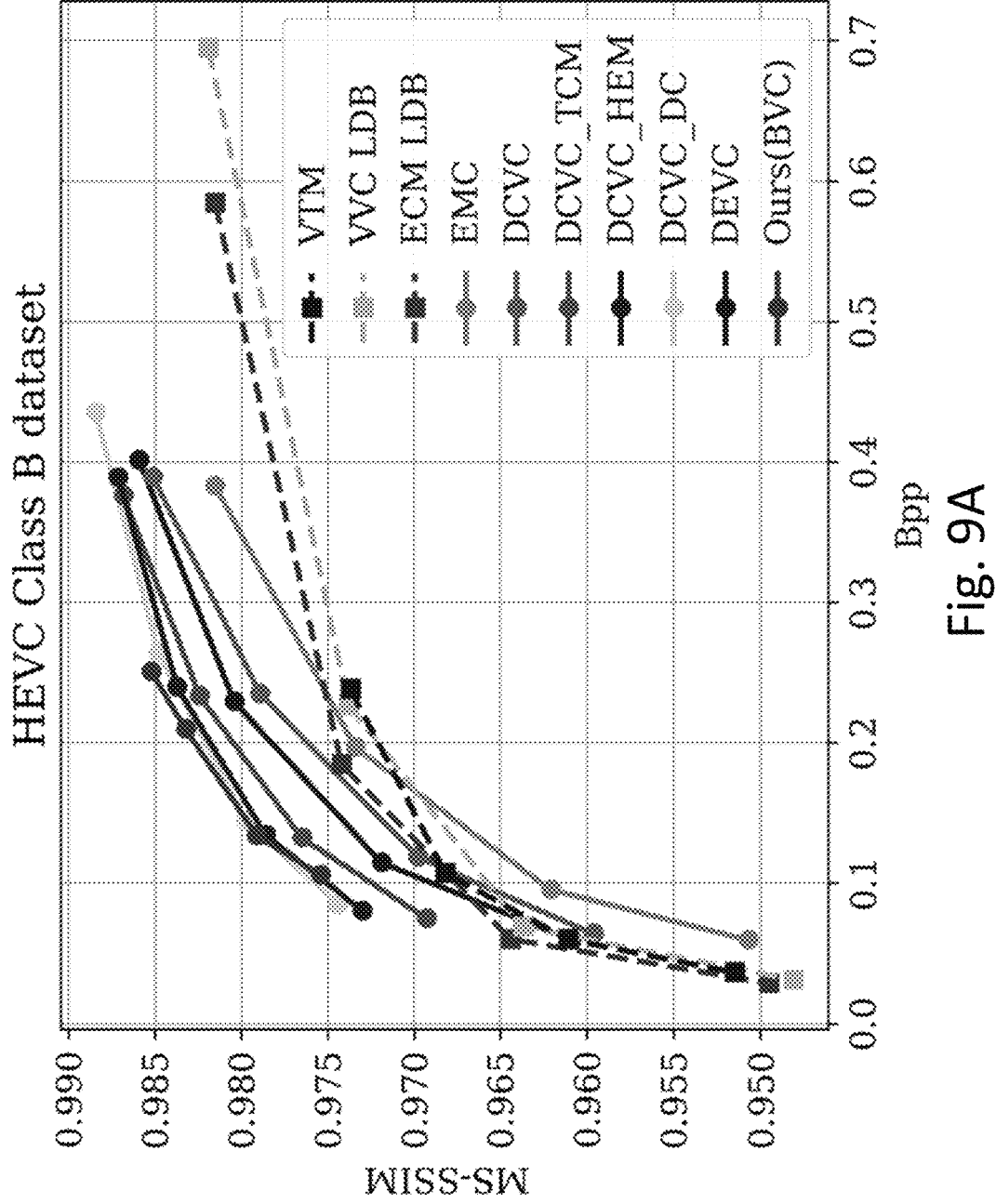
FIGS. 9A to 9F present the Rate-Distortion (RD) curves for MS-SSIM performance comparison.
Figure 9B:
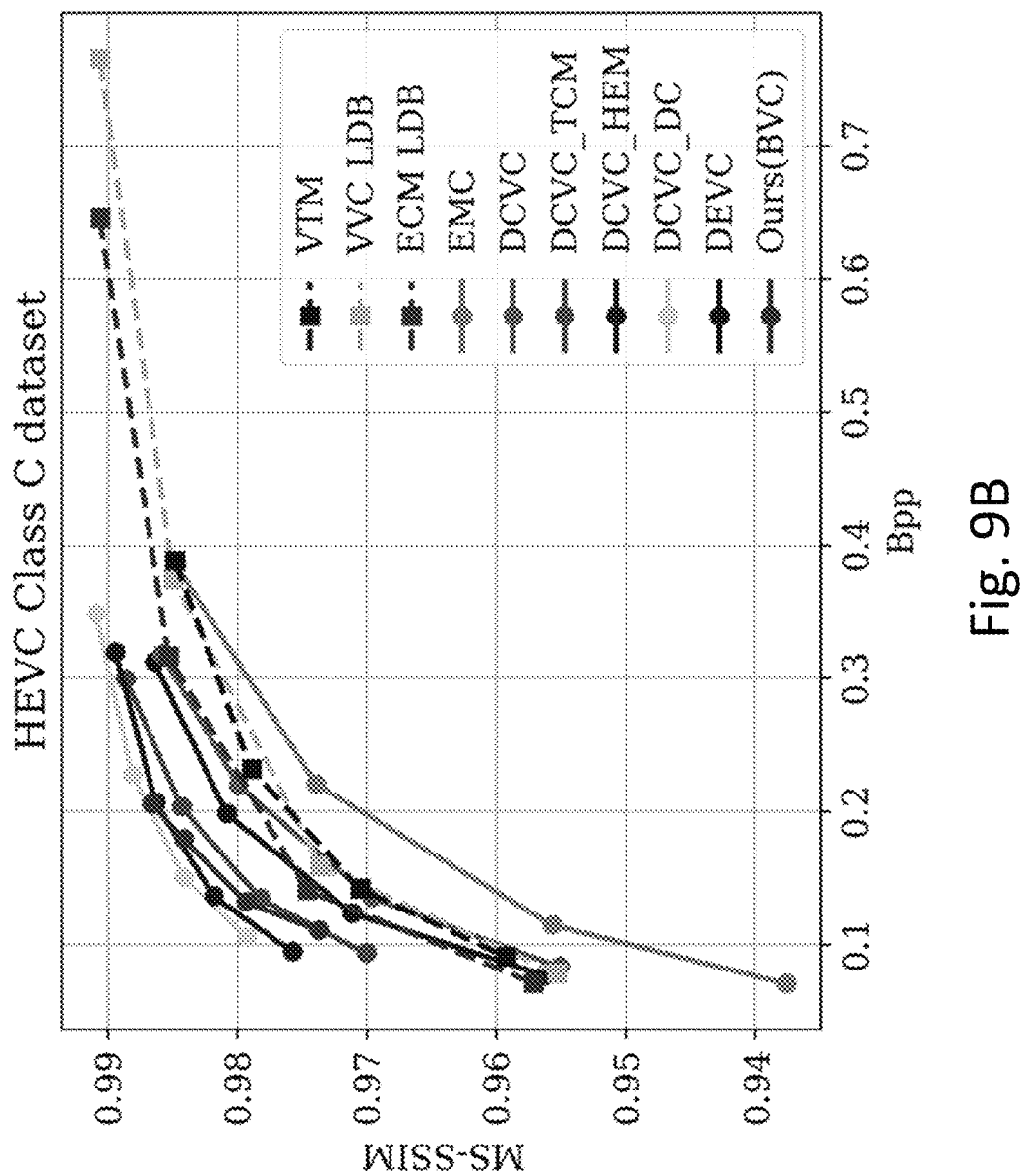
Figure 9C:
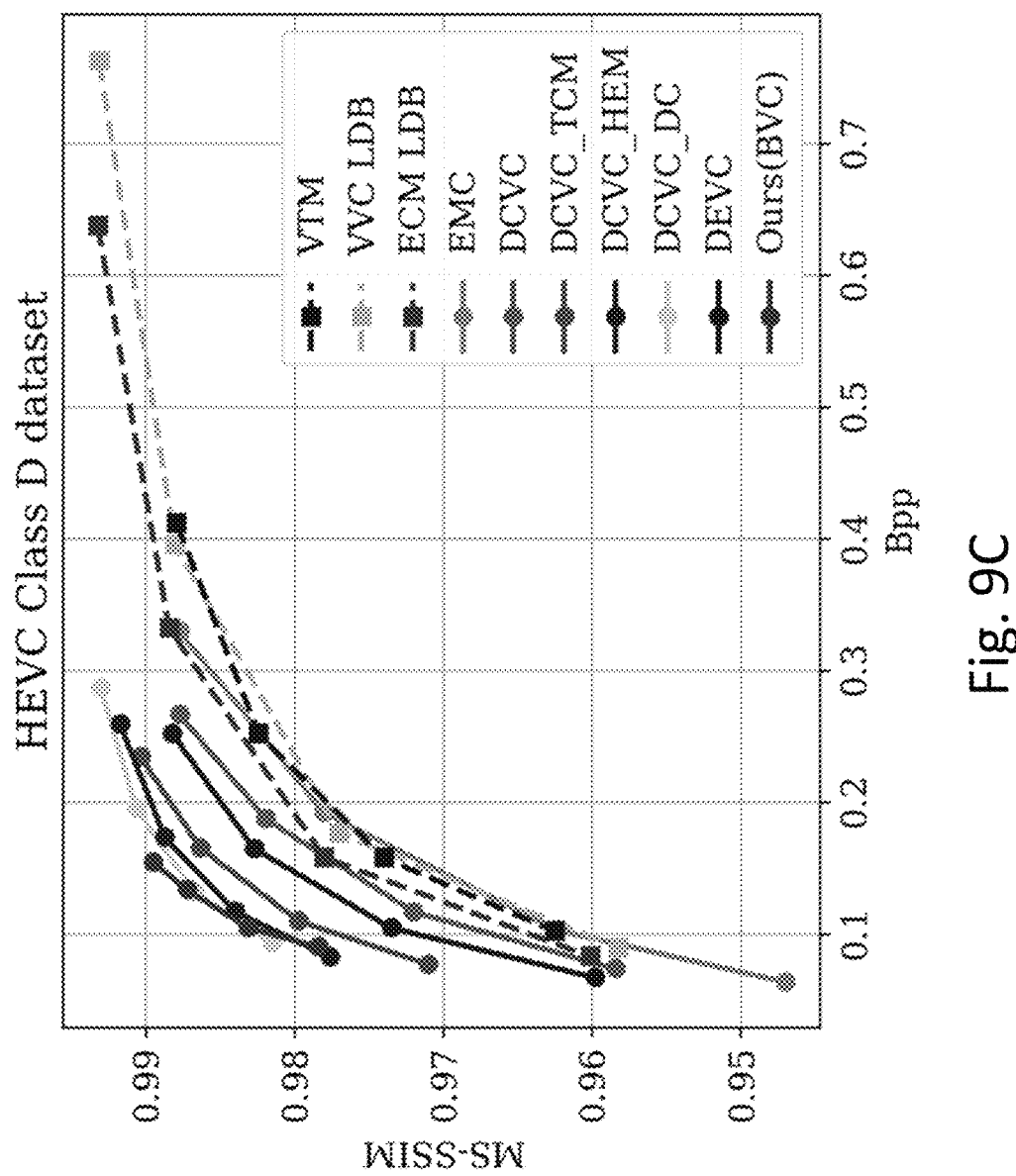
Figure 9D:
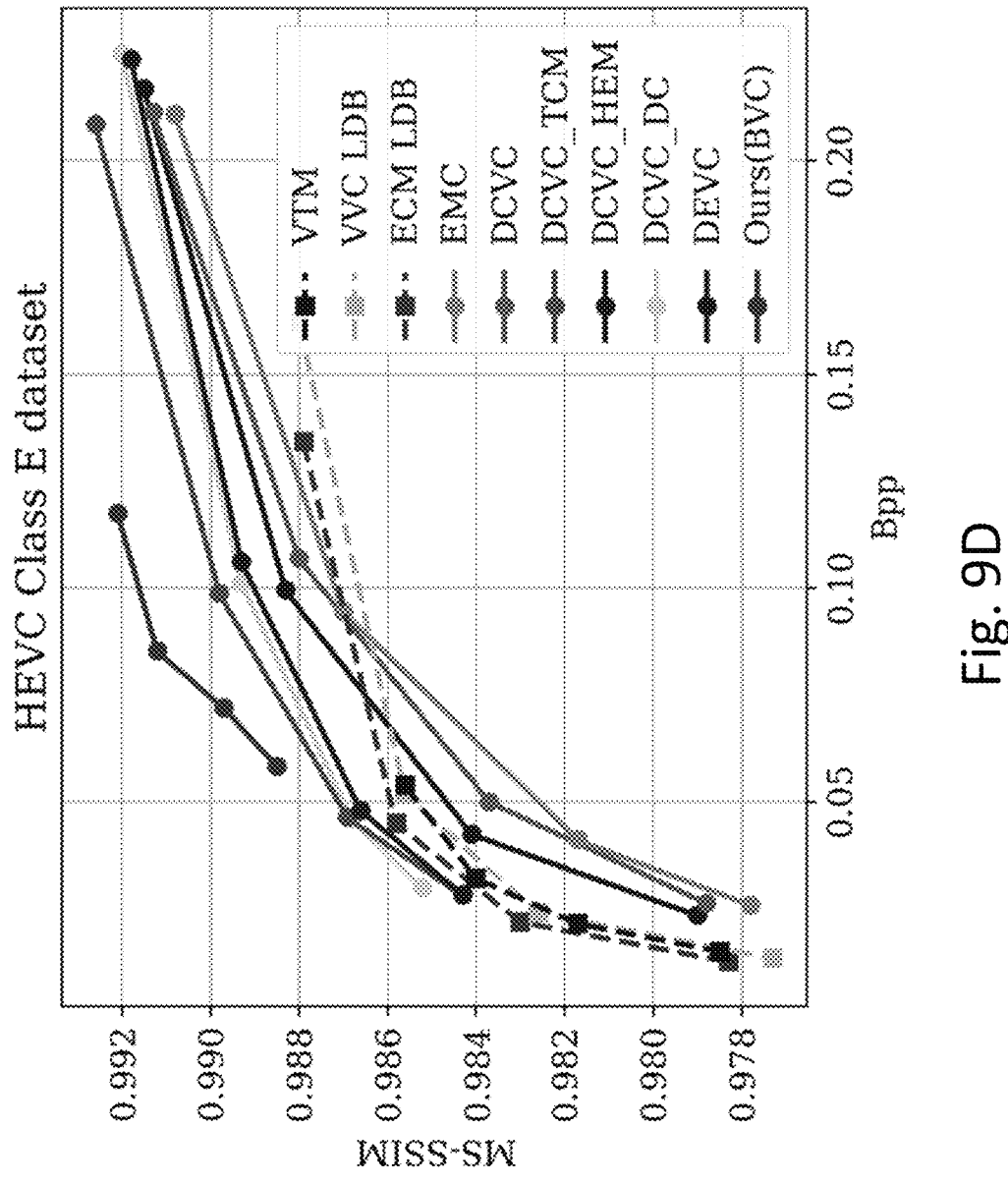
Figure 9E:
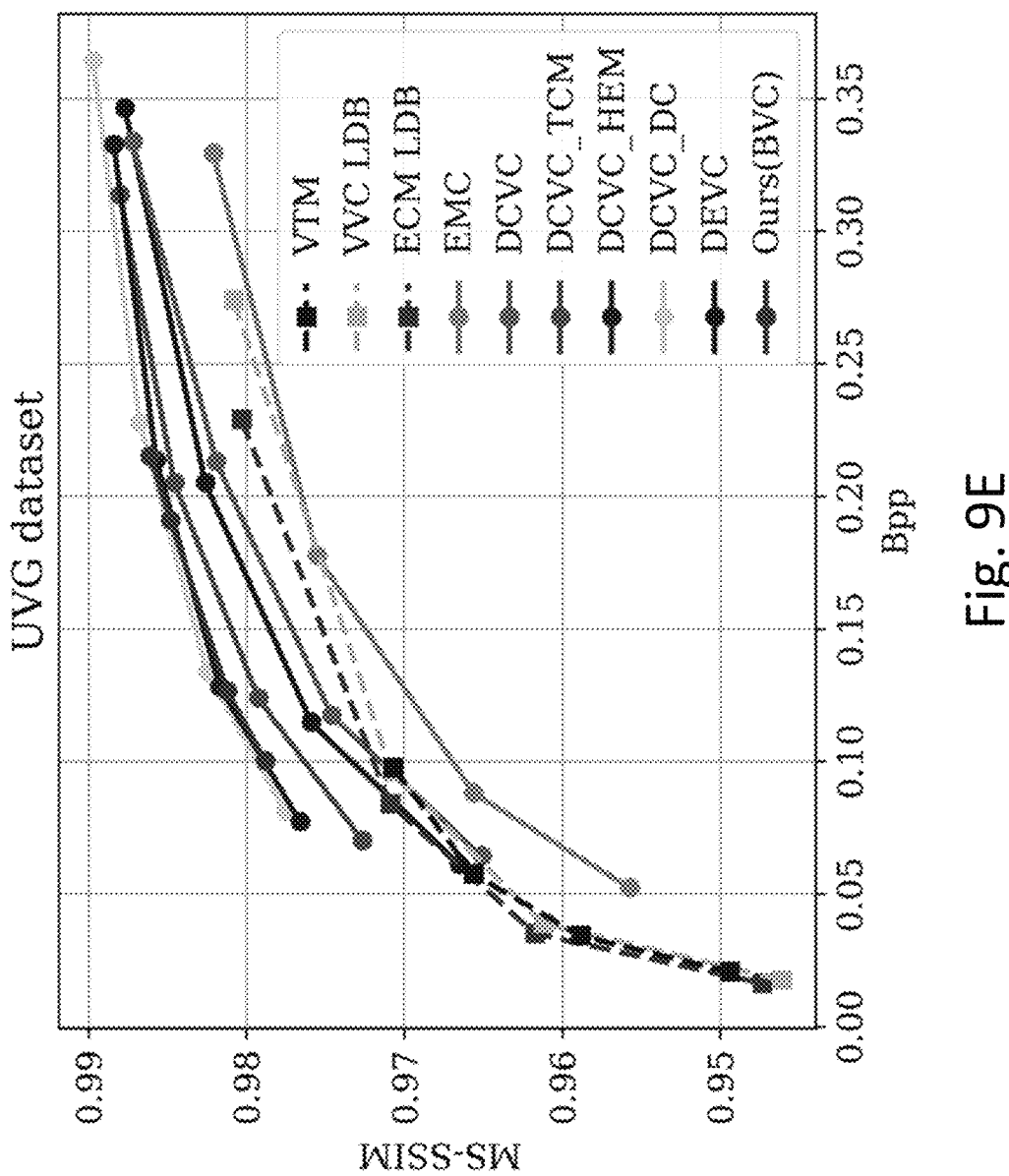
Figure 9F:
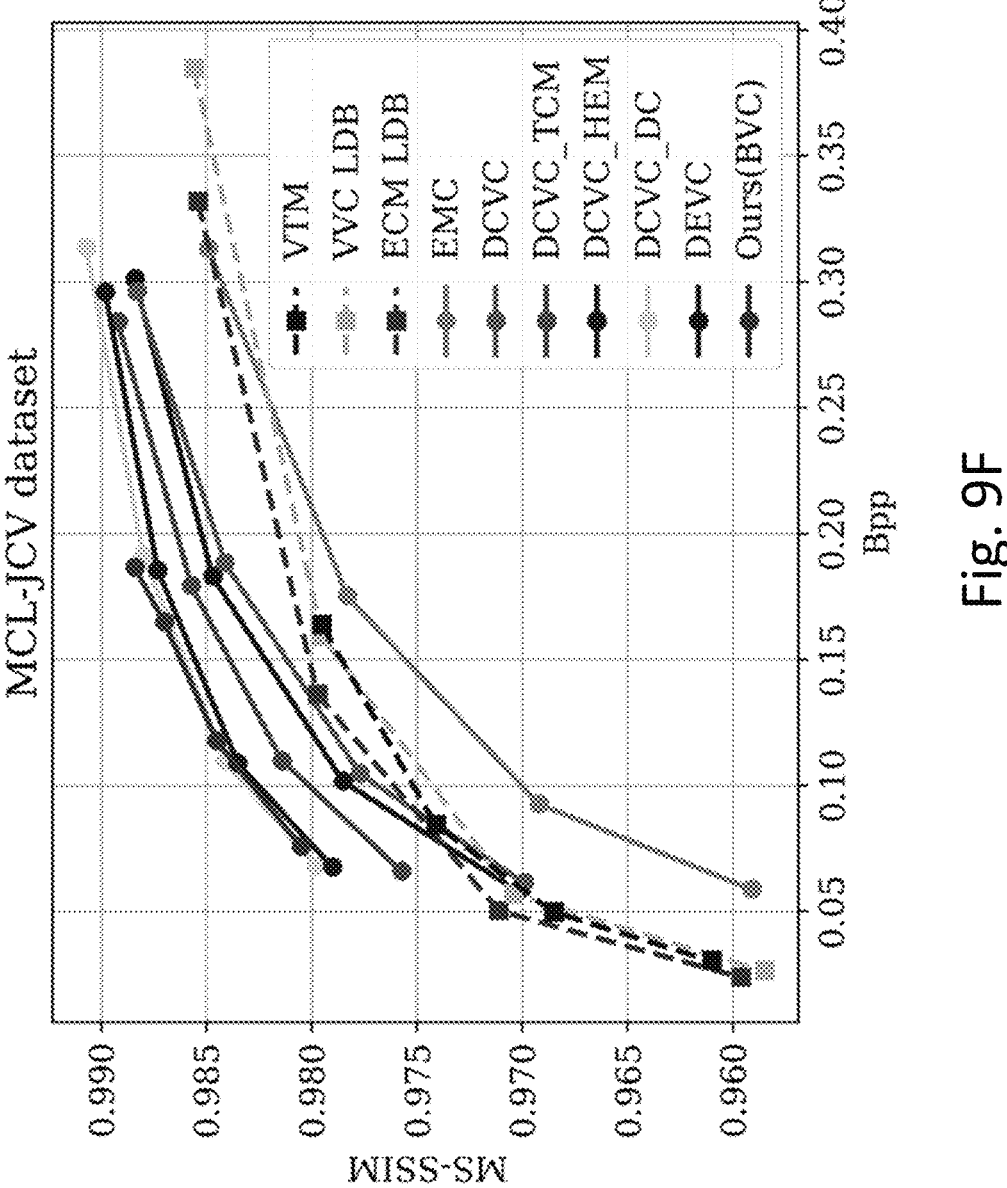
Figure 10B:
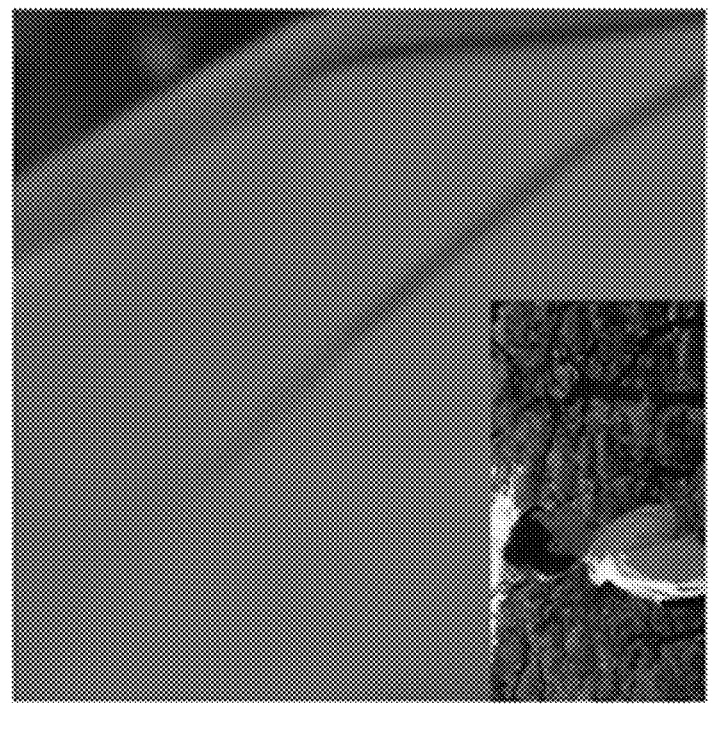
FIGS. 10A to 10H show subjective quality comparison among VTM, ECM, DCVC, DCVC_TCM, DCVC_HEM, DCVC_DC and the proposed method.
Figure 10A:
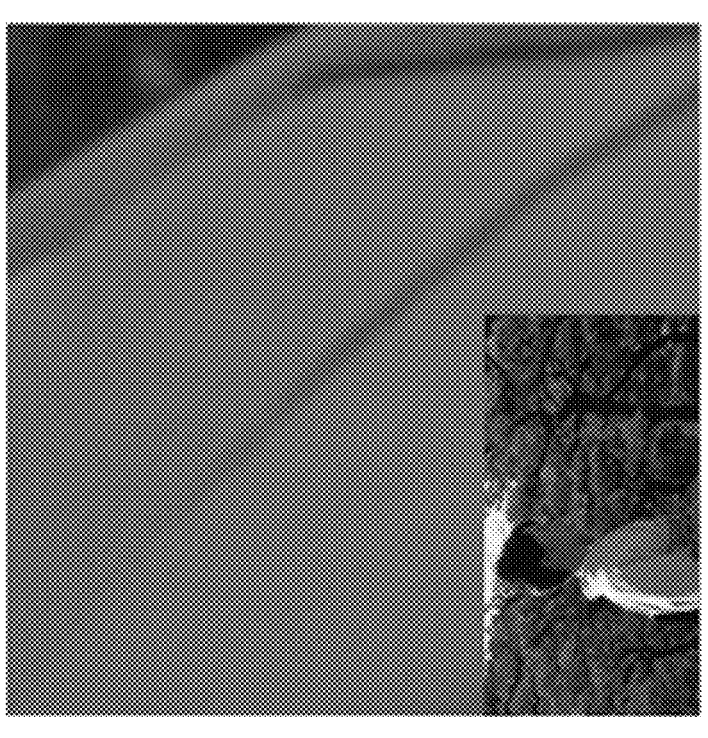
Figure 10D:
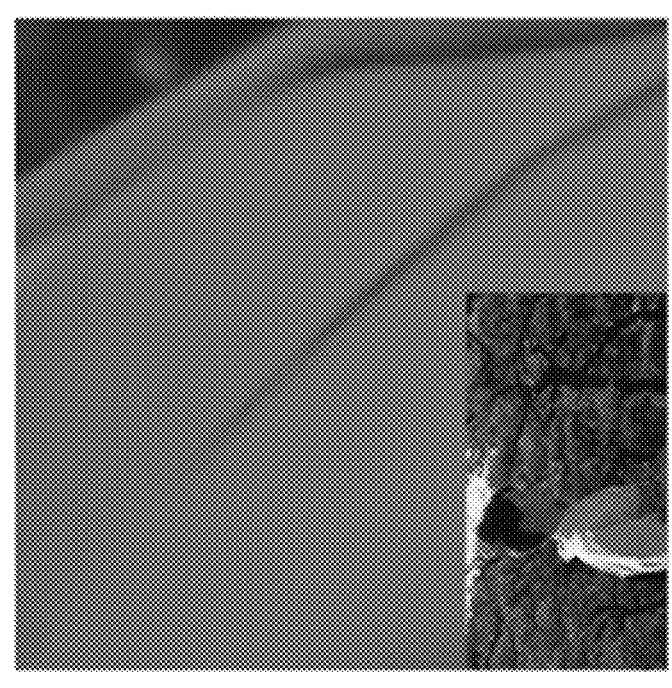
Figure 10C:
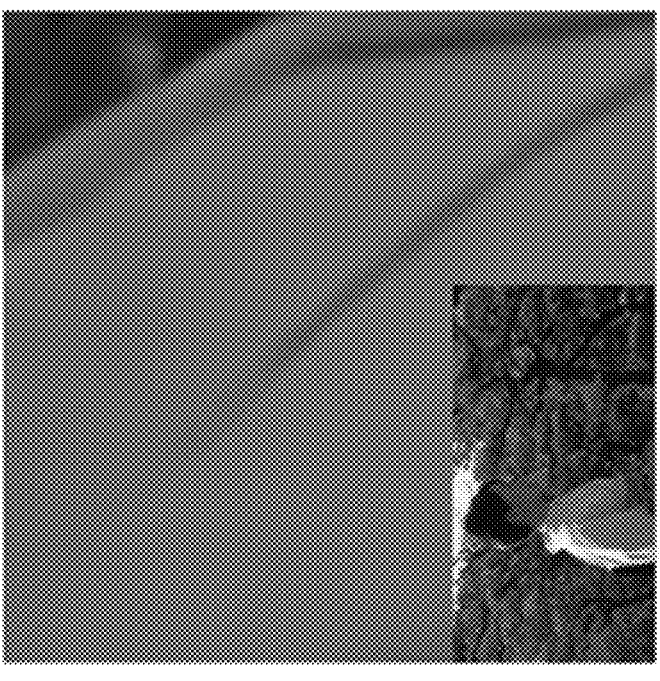
Figure 10F:
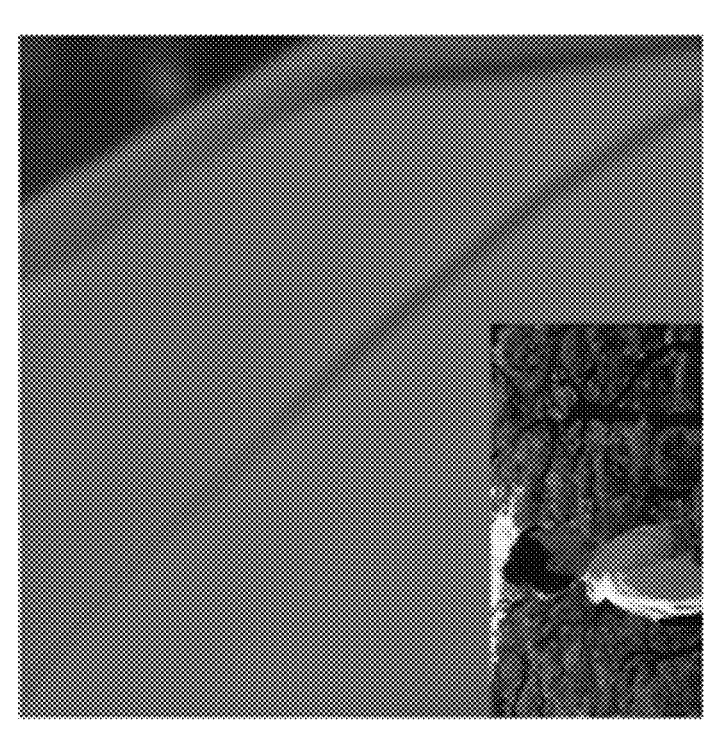
Figure 10E:
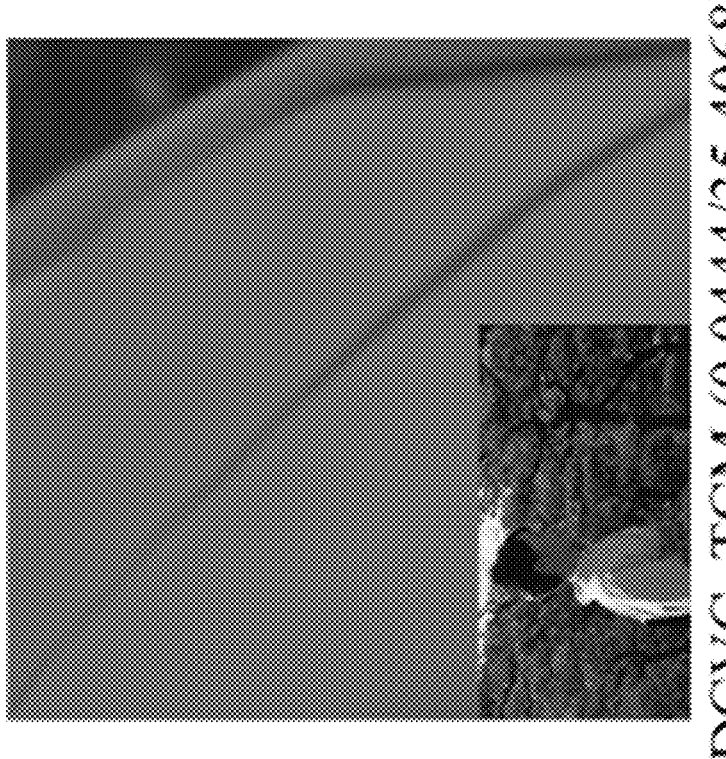
Figure 10H:
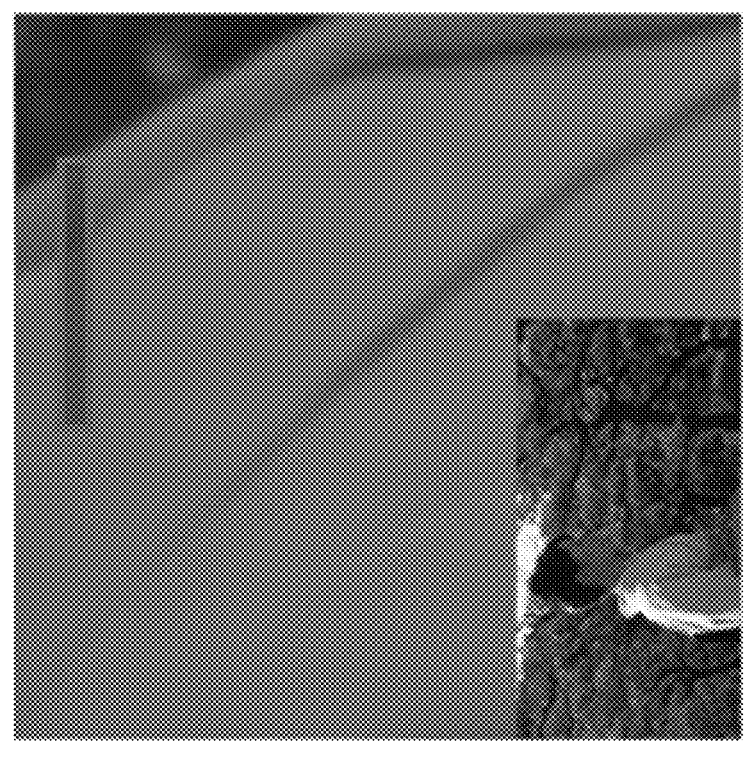
Figure 10G:
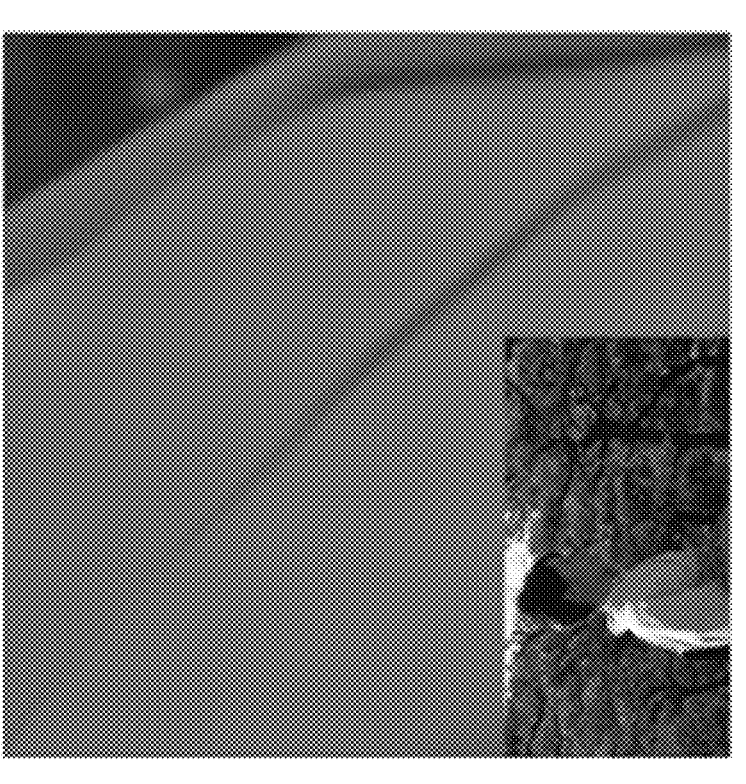

For the learned video compression, reference frames are laid at the start and end of Group of Pictures (GOP). A common practice involves coding reference frames as intra-frames and utilizing them as references for coding the other frames as inter-frames. The present disclosure adheres to standard procedures and showcases the proposed GOP structure configurations, as depicted in FIG. 7. The intra-frames are compressed with learned image compression and are inserted at the GOP boundaries. The proposed method codes the middle inter-frames in a GOP as B frames with the proposed method. Once a B-frame has been encoded, it can serve as a reference for the following B-frame. The proposed method starts from the boundary of the GOP to compress the B frames in sequence until reaching the other boundary. The whole coding process is designed with as low-delay as possible and the performance of the proposed method is compared with traditional codecs Low-Delay B (LDB) configuration in the section II.

II. Experiments Results and Analysis

A. Experimental Details

1) Training Datasets: To be consistent with prior research, such as DVC [3], FVC [33], DCVC [5] and DEVC [29], etc., the Vimeo-90k dataset is utilized for training, which Representative learning-based video coding methods including EMC [24], DCVC [5], DEVC [29], DCVC-TCM [28], DCVC-HEM [13] and DCVCDC [14] are selected as baselines.

TABLE I

THE COMPARISON OF BD-RATE IN TERMS OF PSNR (INTRA PERIOD 10/12)

| Method | Class B | Class C | Class D | Class E | UVG | MCL-JCV | Average |
|---|---|---|---|---|---|---|---|
| VTM LDP | 5.34% | 4.21% | 3.86% | 2.22% | 2.63% | 2.81% | 3.18% |
| ECM LDB | −18.99% | −17.50% | −17.08% | −18.13% | −15.13% | −17.96% | −17.59% |
| EMC [24] | 202.52% | 209.25% | 148.51% | 198.79% | 208.51% | 262.58% | 233.53% |
| DCVC [5] | 51.92% | 81.90% | 52.51% | 95.92% | 52.17% | 74.14% | 69.33% |
| DEVC [29] | 36.22% | 58.25% | 30.40% | 73.32% | 30.15% | 63.68% | 54.28% |
| DCVC-TCM [28] | 23.18% | 58.13% | 29.45% | 49.27% | 6.93% | 32.46% | 30.87% |
| DCVC-HEM [13] | 0.43% | 24.88% | 4.00% | 18.48% | −13.25% | 1.54% | 2.39% |
| DCVC-DC [14] | −7.84% | (7.14%) | (−10.39%) | −1.98% | −20.38% | (−11.09%) | −10.07% |
| BVC (Ours) | (−25.48%) | 18.08% | −10.28% | (−8.62%) | (−49.99%) | −4.21% | (−11.29%) |

The anchor is VTM LDB, and negative numbers indicate bitrate savings.
The best and second-best methods are highlighted in bracket and underlined.

includes 89,800 sequences with 448×256 resolution. Each sequence consists of seven frames. Random cropping is employed to generate 256×256 patches.

2) Testing Datasets: The learned video compression is evaluated on HEVC standard sequences [34], which are commonly used in the video standard community, as well as 1920×1080 resolution sequences from UVG and MCL-JCV datasets. HEVC ClassA sequences are excluded from the evaluation, as previous learning-based methods have not been tested on these sequences.

3) Training Settings: The whole model implementations are executed on NVIDIA RTX 3090 GPUs using the PyTorch. The reference frame generator is applied as the preprocess to generate the reference frame for P-frame coding. The P-frame coding is trained with four distinct $\lambda$ values. For PSNR evaluation, the $\lambda$ values are set at 512, 1024, 2048, and 4096. For MS-SSIM evaluation, the $\lambda$ values are 32, 64, 96, and 128. The batch size is set to 4 for training. The AdamW optimizer is applied to minimize the whole loss with 1e-4 as the initial learning rate; subsequently, the learning rate is reduced to 1e-5 at the convergence stage.

4) Testing Settings: In line with the testing methodology established in the former learned video compression methods [5], [28], [29], the GOP is set to 10 for HEVC sequences and 12 for other sequences. 100 frames are evaluated for HEVC sequences and 120 frames are evaluated for the other sequences. Because the present disclosure solely focuses on inter-frame coding, learning-based image compression models are applied exclusively for intra-frame coding. Specifically, the testing keeps the intra-frame coding the same as DCVC-TCM for fair comparison and applies IntraNoAR [28] for the PSNR and the MS-SSIM target, respectively. Moreover, to discuss the impact of the GOP size, the testing results for performance comparison are also presented when the GOP is 32.

B. Performance Evaluation

Provided is a comparative analysis of the proposed method against the traditional video codec VTM (VVC Test Model) [2] and under-developing next-generation traditional codec ECM [38] to showcase the coding efficiency achieved through the proposed design. Based on the common practice of applying neural networks in the RGB domain for visual tasks, the quality of frames in the RGB format is evaluated.

1) PSNR Metric Evaluation: The performance of the proposed method is evaluated by the BD-Rate metric [39]. Taking VTM LDB as a baseline, the performance result comparison in terms of PSNR is provided as shown in Table I. Negative numbers indicate bitrate savings. The best-performing and second-best-performing learned video coding methods are highlighted in bracket and underlined, respectively. Furthermore, the Rate-Distortion (RD) curves are presented in FIGS. 8A to 8F, where the horizontal axis represents bits per pixel (bpp) and the vertical axis represents PSNR. These values are averaged for each class dataset. The intra-period is set as 10/12.

As observed from Table I, the proposed Bidirectional Video Compression (BVC) exhibits a substantial performance advantage compared to traditional video codec VTM, showing the great potential of learning-based video compression. When GOP size is set as 10/12, the BVC outperforms VTM LDB configurations by achieving an average of 11.29% bit savings. Significantly, the proposed BVC surpasses the next-generation traditional codec ECM on Class B and UVG datasets. Moreover, the proposed BVC is developed based on DCVC-TCM [28], and it consistently demonstrates superior performance across all testing datasets compared with DCVC-TCM. The proposed BVC framework is also superior to the DCVC-DC on Class B, Class E and UVG.

It is noted that the proposed method gains 40% compression improvement compared with DCVC-TCM, but it is still worse than DCVC-DC around 10% on the Class C dataset. It may be because the Class C dataset contains large motion and complex texture while the training dataset Vimeo-90k contains relatively smoother motion. The gap between training and testing leads to reasonably worse performance in Class C.

Furthermore, it is important to note that ECM is mainly optimized for YUV420 at the current stage. Li et al. [14] identify several bugs in the support for YUV444 when utilizing ECM for testing RGB videos. Consequently, ECM is adjusted to ensure proper support for YUV 444 coding. In the present disclosure, the ECM is not fixed to support YUV 444 coding and the ECM is only used to encode and decode videos in YUV 420. Additionally, in DCVC-DC [14], the intra-period is specifically set as 32. This choice is justified by the claim that an intra-period of 32 closely aligns with the practical usage observed in real-world applications. However, based on the former learned video compression methods and the intra-period is set as 10/12 in Table. I. Therefore, it is reported that DCVC-DC outperforms ECM in [14], but the DCVC-DC still doesn't surpass the ECM in Table I. To demonstrate a more comprehensive comparison and investigate the GOP size influence, the intra-period is modified to 32 accordingly and the BD-Rate comparison is obtained as depicted in Table II.

TABLE II

| | THE COMPARISON OF BD-RATE IN TERMS OF PSNR (INTRA PERIOD 32) | | | | | | |
|---|---|---|---|---|---|---|---|
| Method | Class B | Class C | Class D | Class E | UVG | MCL-JCV | Average |
| VTM LDP | 9.86% | 9.16% | 9.63% | 15.56% | 3.58% | 4.41% | 6.20% |
| ECM LDB | −18.81% | −19.70% | −20.19% | −21.02% | −16.02% | −19.14% | −18.93% |
| EMC [24] | 314.37% | 302.75% | 118.85% | 478.80% | 324.67% | 391.70% | 353.17% |
| DCVC [5] | 108.45% | 112.93% | 38.09% | 263.27% | 122.23% | 138.98% | 131.34% |
| DEVC [29] | 65.12% | 100.34% | 70.02% | 159.98% | 58.34% | 106.21% | 95.88% |
| DCVC-TCM [28] | 28.12% | 68.75% | 31.63% | 66.43% | 11.30% | 39.60% | 37.90% |
| DCVC-HEM [13] | −4.83% | 22.40% | −4.62% | 8.93% | −18.51% | −3.64% | −3.11% |
| DCVC-DC [14] | −17.64% | (−3.37%) | (−23.47%) | −22.28% | −27.55% | (−18.56%) | −19.10% |
| BVC (Ours) | (−37.21%) | 18.75% | −21.37% | (−27.44%) | (−55.66%) | −15.33% | (−21.29%) |

The anchor is VTM LDB, and negative numbers indicate bitrate savings.
The best and second-best methods are highlighted in bracket and underlined.

20     When the intra-period is 32, the proposed method BVC outperforms the VTM LDB baseline with an average of 21.29% bit-savings. It is observed that the advantage of the proposed method is more obvious when the GOP size is larger. Moreover, the DCVC-DC is better than ECM LDB in 25 Table III, which corresponds to the report's claim that DCVC-DC has surpassed the next-generation codec ECM in [14]. Unlike the designs in DCVC-DC, including the hierarchical quality structure, offset diversity and quadtree partition-based entropy coding, the proposed method provides 30 a potential solution for bidirectional learned video compression. Experiment results demonstrate that the proposed BVC performs on par with the DCVC-DC, surpassing the DCVC-DC on average, especially on Class B, Class E and UVG datasets.

TABLE III

| | THE COMPARISON OF BD-RATE IN TERMS OF MS-SSIM (INTRA PERIOD 10/12) | | | | | | |
|---|---|---|---|---|---|---|---|
| Method | Class B | Class C | Class D | Class E | UVG | MCL-JCV | Average |
| VTM LDP | 4.39% | 5.02% | 4.34% | 2.89% | 3.18% | 3.65% | 3.77% |
| ECM LDB | −17.50% | −16.55% | −15.66% | −16.55% | −13.56% | −16.71% | −16.27% |
| EMC [24] | 33.33% | 45.13% | 13.25% | 73.30% | 61.51% | 94.84% | 73.51% |
| DCVC [5] | −10.42% | 7.52% | −4.03% | 57.88% | 14.17% | 9.49% | 9.80% |
| DEVC [29] | −25.03% | −7.80% | −19.86% | 28.62% | −8.31% | −3.06% | −5.67% |
| DCVC-TCM [28] | −50.08% | −33.10% | −40.98% | −38.30% | −37.83% | −30.03% | −34.47% |
| DCVC-HEM [13] | −62.39% | −46.64% | −50.90% | −32.92% | −52.24% | −43.66% | −46.72% |
| DCVC-DC [14] | −65.37% | (−52.86%) | −56.58% | −43.53% | (−56.10%) | −46.54% | −50.64% |
| BVC (Ours) | (−69.48%) | −42.93% | (−60.18%) | (−86.69%) | −55.08% | (−49.16%) | (−54.34%) |

The anchor is VTM LDB, and negative numbers indicate bitrate savings.
The best and second-best methods are highlighted in bracket and underlined.

TABLE IV

| | THE COMPARISON OF BD-RATE IN TERMS OF MS-SSIM (INTRA PERIOD 32) | | | | | | |
|---|---|---|---|---|---|---|---|
| Method | Class B | Class C | Class D | Class E | UVG | MCL-JCV | Average |
| VTM LDP | 8.50% | 9.14% | 8.30% | 15.00% | 4.31% | 4.26% | 5.95% |
| ECM LDB | −20.31% | −20.34% | −20.92% | −19.69% | −15.43% | −19.15% | −19.02% |
| EMC [24] | 57.45% | 80.09% | 35.73% | 147.84% | 117.25% | 129.16% | 111.12% |
| DCVC [5] | 3.65% | 27.15% | 5.53% | 119.38% | 54.54% | 29.42% | 33.43% |
| DEVC [29] | −22.06% | −2.68% | −21.40% | 45.42% | 5.16% | 3.87% | 1.55% |
| DCVC-TCM [28] | −44.08% | −28.14% | −41.25% | −22.88% | −29.03% | −21.99% | −26.97% |
| DCVC-HEM [13] | −62.33% | −47.46% | −59.04% | −33.01% | −52.21% | −44.43% | −47.83% |
| DCVC-DC [14] | −67.25% | (−58.81%) | −66.33% | −51.84% | (−59.30%) | −50.79% | −55.30% |
| BVC (Ours) | (−72.67%) | −46.19% | (−67.10%) | (−100.00%) | −57.70% | (−51.93%) | (−58.07%) |

The anchor is VTM LDB, and negative numbers indicate bitrate savings.
The best and second-best methods are highlighted in bracket and underlined.

2) MS-SSIM Metric Evaluation: In addition, the performance of the proposed method using the BD-Rate metric for MS-SSIM is presented. Using the VTM LDB configuration as the anchor, the performance of MS-SSIM is compared, as illustrated in Table III. Furthermore, the bpp and MS-SSIM values are calculated on average and the rate-distortion (RD) curves are visualized in FIGS. 9A to 9F. The intra-period is set as 10/12.

Compared with traditional codecs, the proposed learning-based coding method performs better regarding MS-SSIM. In detail, the proposed BVC framework surpasses VTM LDB by 54.34% on average. Meanwhile, the proposed BVC shows better compression efficiency on all testing datasets than ECM LDB. Regarding the comparison with other learning-based coding methods, the proposed BVC exceeds DCVC-TCM all the time, indicating the correctness of the proposed design. Furthermore, the proposed BVC is around 4% better than the SOTA DCVC-DC on average. Furthermore, the intra-period size is set to 32 and the MSSSIM performance is demonstrated in Table IV. Compared with VTM LDB, it is observed that 58.07% bit-saving is obtained with the proposed BVC method in terms of MS-SSIM. Moreover, it outperforms the next-generation codec ECM with around 39% bit savings. The MS-SSIM performance again proves that the proposed method performs better when the GOP size is larger.

3) Subjective Quality Comparisons: Regarding the subjective quality comparison, the frame is selected from HEVC Class B Kimono for comparative analysis. FIGS. 10A to 10H demonstrate the subjective quality comparison with VTM LDB configuration, next-generation codec ECM LDB configuration, DCVC [5], DCVC TCM [28], DCVC HEM [13], DCVC DC [14] and the proposed method. To enhance visualization, frame cropping is employed and the cropped portion is enlarged. As shown in FIGS. 10A to 10H, the proposed scheme has efficiently compressed the frame from HEVC Class B Kimono and achieved impressive frame quality with fewer bit consumption. Significantly, the crease on the top-left of DCVC TCM is more visible than the origin frame. The possible reason is that the temporal context mining module proposed in DCVC TCM fuses multiple feature layers, resulting in new artifacts. Meanwhile, the proposed method exhibits minimal artifacts and more details, demonstrating the efficiency of the proposed design.

4) Implementation details for traditional codecs: As the present disclosure is related to bidirectional frames, encoder_lowdelay_vtm.cfg is used for the baseline of bidirectional frame coding as a fair comparison.

Regarding VVC, VTM-13.2 is taken as a competitive baseline to compress the testing dataset. Because the GOP size of VTM with encoder low-delay vtm configuration is 8, it only supports intra-period as multiples of 8. Therefore, the intraperiod is set to 16/32 as the Low-Delay B (LDB) configuration of VVC for performance comparison.

EncoderAppStatic-c encoder_lowdelay_vtm.cfg
—InputFile==input.yuv —BitstreamFile=rec.bin
—DecodingRefreshType=2 —InputBitDepth=8
—OutputBitDepth=8 —OutputBitDepthC=8
—FrameRate=FR —FramesToBeEncoded=N
—SourceWidth=W —SourceHeight=H —Intra
Period=16 —QP=QP —Level=6.2
—ReconFile=rec.yuv
where W, H, FR, N, and QP are the height, width, frame rate, number of encoded frames, and quantization parameter, respectively. In addition, 100 frames are tested for HEVC and 120 frames are tested for other sequences. VVC Low- Delay P (LDP) performance is tested by changing the configuration to encoder_lowdelay_P_vtm.cfg as DEVC [1].

The under-developing next-generation traditional codec Enhanced Compression Model (ECM) is also tested. ECM-8.0 is taken and the intraperiod is set as 16/32 for LDB configuration as follows.

EncoderAppStatic-c encoder_lowdelay_ecm.cfg
—InputFile=input.yuv —BitstreamFile=rec.bin —De-
codingRefreshType=2 —InputBitDepth=8 —Output-
BitDepth=8 —OutputBitDepthC=8 —FrameRate=FR
—FramesToBeEncoded=100 —SourceWidth=W
—SourceHeight=H —Intra Period=16 —QP=QP
—Level=6.2 —ReconFile=rec.yuv
where W, H, FR, N, and QP are the height, width, frame rate, number of encoded frames, and quantization parameter, respectively.

C. Complexity Analysis

The model complexity is assessed by considering various factors such as the size of model parameters, the number of MACs (multiply-accumulate operations), and the encoding-decoding time. The 1920×1080 resolution sequence is used for the complexity test, and the complexity comparison details are listed in Table V. It is noticed that DCVC-HEM [13] and DCVC-DC [14] support rate adjustment in a single model, while others don't merge rate models. Due to the different design settings, the number of parameters of DCVC-HEM is 67M, which is much larger than others. Meanwhile, the DCVC-DC parameters' number is not reported in [14]. The DCVC-HEM and DCVC-DC are marked with a star symbol, respectively, as shown in Table V. The parameter number of the proposed method is 17.4M, while that of DCVC-TCM is 10.7M. The MACs of the proposed BVC is 3.2T when processing 1920×1080 resolution sequence, while that of DCVC-TCM is 2.9T. Moreover, the comparison demonstrates that the proposed method takes 2.08s to encode a 1920×1080 frame and 0.84s to decode it on average. The proposed method is more complex than DCVC-TCM, while the proposed design improves compression efficiency.

TABLE V

COMPLEXITY COMPARISON

| | Params. (M) | MACs (T) | Enc time (s) | Dec time (s) |
|---|---|---|---|---|
| DCVC [5] | 7.9 | 2.4 | 12.26 | 35.59 |
| DEVC [29] | 8.5 | 3.5 | 12.51 | 36.32 |
| DCVC-TCM [28] | 10.7 | 2.9 | 0.88 | 0.47 |
| DCVC-HEM [13] | 67.0* | 3.3 | 0.99 | 0.53 |
| DCVC-DC [14] | * | 2.6 | 1.00 | 0.77 |
| Ours (BVC) | 17.4 | 3.2 | 2.08 | 0.84 |

1920 x 1080 resolution is used for test.

D. Error Propagation Analysis

Figure 11A:
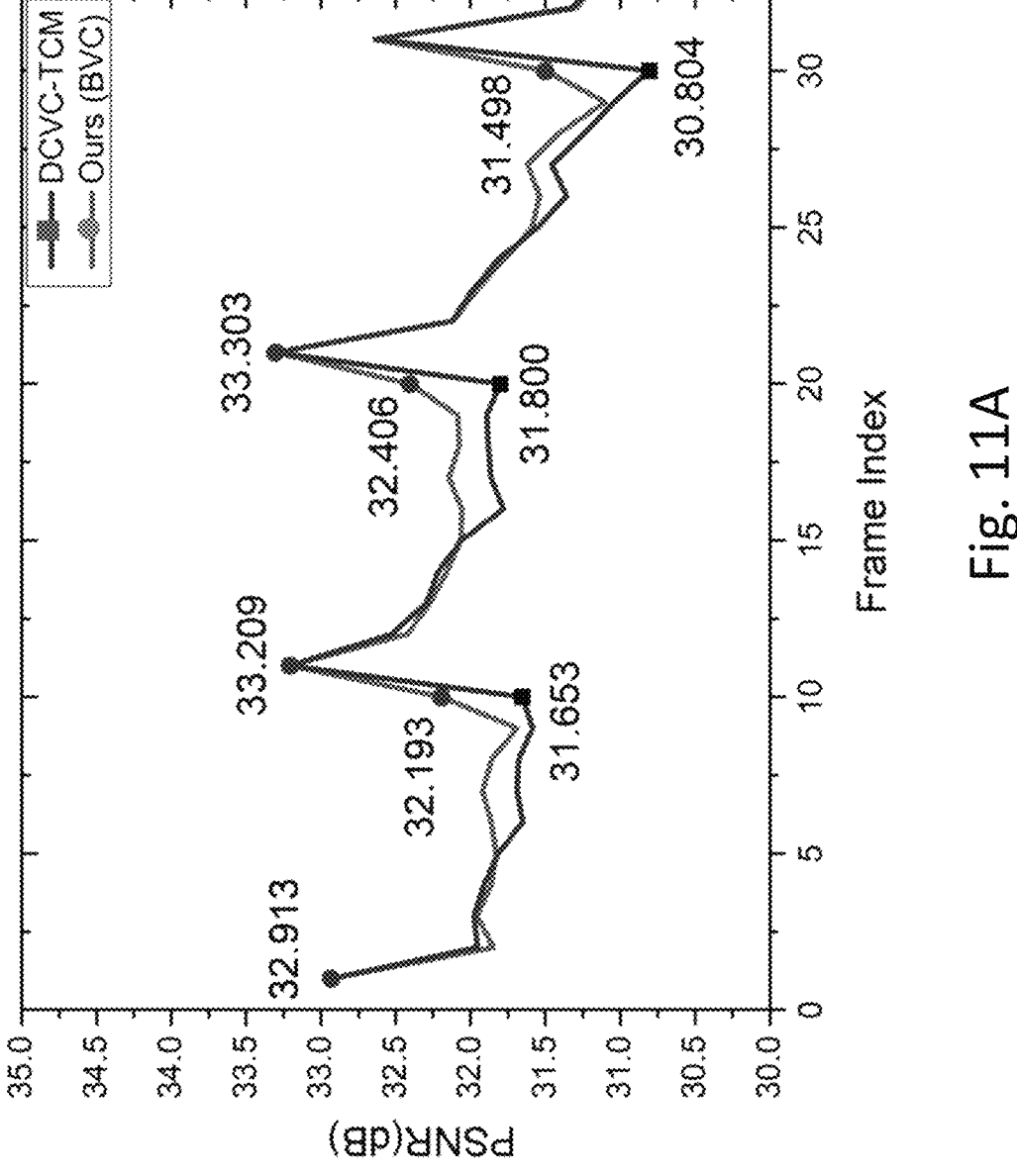
FIGS. 11A and 11B present PSNR and Bitrate comparisons respectively.
Figure 11B:
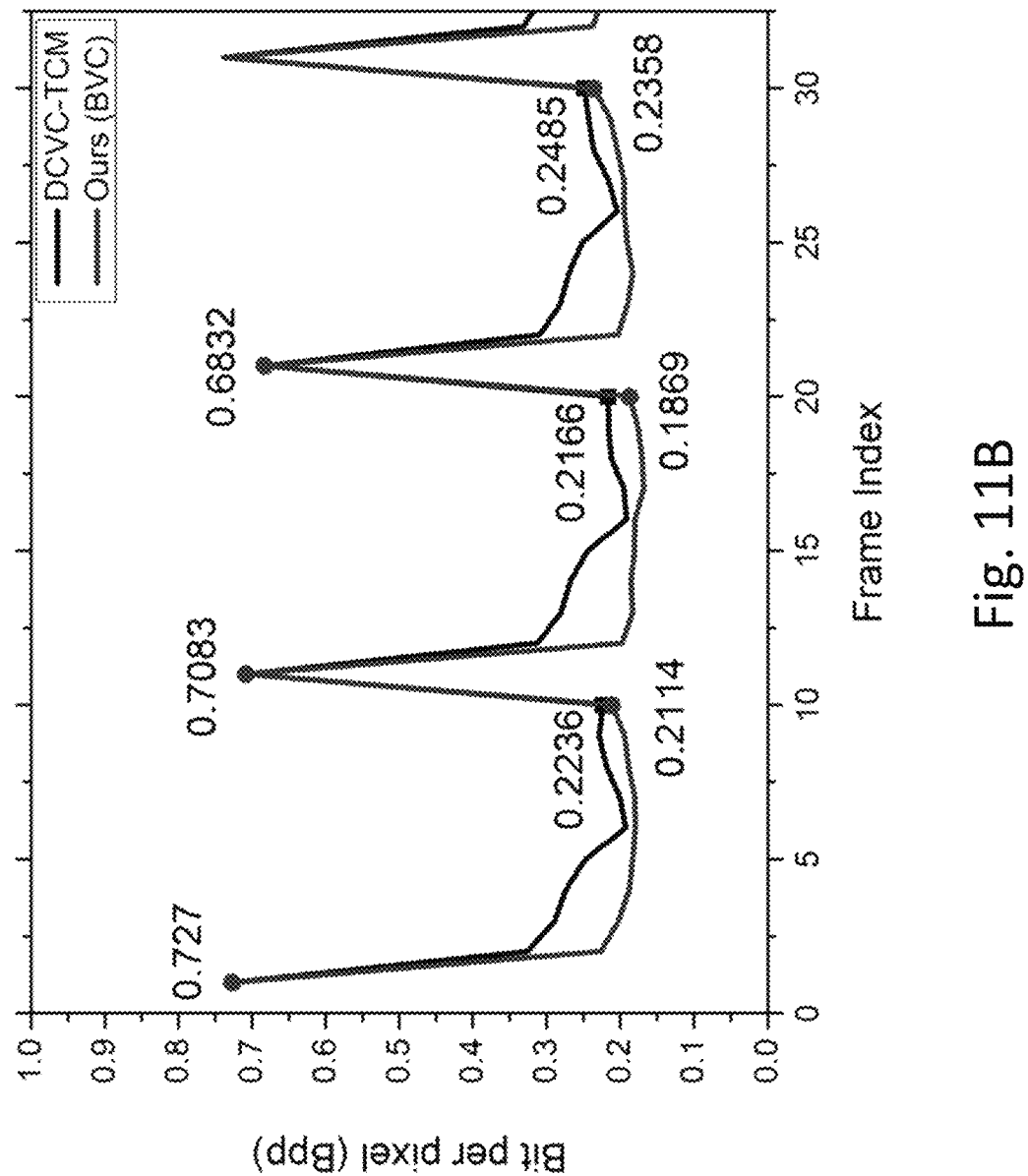

The RaceHorses sequence is chosen from HEVC Class C as a case study for error propagation analysis. Since the proposed BVC is built upon DCVC-TCM, DCVC-TCM is used as a benchmark for comparison. FIGS. 11A and 11B visualize the comparisons using the frame index as the horizontal axis and the PSNR/Bit per pixel as the vertical axis. The first frame in a GOP is encoded using IntraNoAR [28] as an Intra frame with higher bit rates and quality. All subsequent frames are encoded as inter frames with DCVC-TCM or the proposed method. When compared to DCVC-TCM, the proposed method delivers superior frame quality at a lower bit cost. Furthermore, the proposed method demonstrates less fluctuation in both frame quality and bit cost, which validates the correctness of the proposed bidirectional scheme. Taking RaceHorses sequence from HEVC Class C as an example, it is evident that the proposed method BVC outperforms DCVC-TCM in terms of reconstruction quality while utilizing significantly fewer bits.

E. Ablation Study

1) Effectiveness of Components: Demonstrated is the ablation study of different components in our scheme, including the proposed Reference Frame Generator (RGF) and Inverse Channel-wise Entropy Model (ICEM). The final solution is taken as the anchor and the performance is compared, as shown in Table VI. The positive numbers indicate a decline in compression performance. It is observed from Table VI that 52.77% performance improvement on average can be achieved with the proposed RGF and ICME. Meanwhile, around 17.82% performance is obtained by only applying the proposed RGF. Moreover, an extra 34.95% gain is acquired with the ICEM. The above performance results clearly prove that the proposed bidirectional video compression method is correct and effective.

TABLE VI

ABLATION STUDY OF COMPONENTS IN OUR SCHEME

| RFG | ICEM | B | C | D | E | Average |
|---|---|---|---|---|---|---|
| ✓ | ✓ | 0.0% | 0.0% | 0.0% | 0.0% | 0.0% |
| ✓ | X | 68.08% | 15.29% | 23.34% | 45.22% | 34.95% |
| X | X | 77.95% | 25.26% | 35.06% | 71.10% | 52.77% |

Positive numbers indicate a decline in compression performance.

2) Reference Frame Generator: To study the benefit of the proposed RFG, the backbone of RFG is modified to PSNR/MSSSIM respectively and performance comparison is demonstrated in Table VII. There is a 1.53% performance decline if the PSNR metric is applied to judge the similarity and generate the reference frame. In addition, there is a 1.14% decline with MS-SSIM. Furthermore, the concept of the bidirectional method itself can lead to a significant improvement in performance. Considering the rich information in the feature frame, the proposed RFG is designed to generate the reference frame. The experiment results correspond to the proposed design insight that the learning-based neural network can work better than directly applying the traditional metrics PSNR/MS-SSIM.

TABLE VII

ABLATION STUDY OF REFERENCE
GENERATE FRAME MODULE

| Backbone | B | C | D | E | Average |
|---|---|---|---|---|---|
| Ours (RFG) | 0.0% | 0.0% | 0.0% | 0.0% | 0.0% |
| With PSNR | 1.97% | 1.46% | 1.24% | 1.27% | 1.53% |
| With MS-SSIM | 1.11% | 1.24% | 0.91% | 1.35% | 1.14% |

Positive numbers indicate a decline in compression performance.

2) Inverse Channel-wise Entropy Model: It is noted that some embodiments of the invention have considered the uneven distribution among channels and proposed predicting the parameters along with the direction of information accumulation. That is, as the beginning channels contain larger entropy, the Inverse Channel-wise Entropy Model is proposed. To verify the benefit of the proposed design, the performance of the proposed method is compared with the not-inverse method in Table VIII. An average of 18.77% performance degradation is observed if the channel is not inverse first. The performance improvement can be due to the fact that the proposed design follows the principle of entropy increase.

TABLE VIII

ABLATION STUDY OF INVERSE
CHANNEL-WISE ENTROPY MODULE

| Method | B | C | D | E | Average |
|---|---|---|---|---|---|
| Ours (Inverse Channel) | 0.0% | 0.0% | 0.0% | 0.0% | 0.0% |
| Not Inverse Channel | 28.26% | 17.17% | 12.29% | 13.75% | 18.77% |

Positive numbers indicate a decline in compression performance.

III. Conclusion

In conclusion, some embodiments of the invention provide a bidirectional, learning-based approach for learned video compression, which has shown superior performance compared to the VTM LDB by achieving an average bit savings of 11.29% in terms of PSNR. This surpasses the DCVC-DC method. With respect to MS-SSIM, the proposed method has recorded an average gain of 54.34% when compared to VTM LDB. The enhanced performance achieved by the proposed approach can be attributed to a few key design elements. Firstly, a reference frame generation module is provided to utilize feature similarity instead of interpolation, considering the abundant information in the bidirectional frames and motion complexity. Furthermore, an inverse channel-wise entropy model is implemented to account for uneven distribution across channels. As part of this, the relationship among channels is redesigned so that channels with higher entropy receive more inputs as references in the proposed model. Experimental results and subsequent analysis confirm that these design considerations contribute to heightened compression efficiency, thereby validating the accuracy and efficacy of the proposed approach.

System

Figure 12:
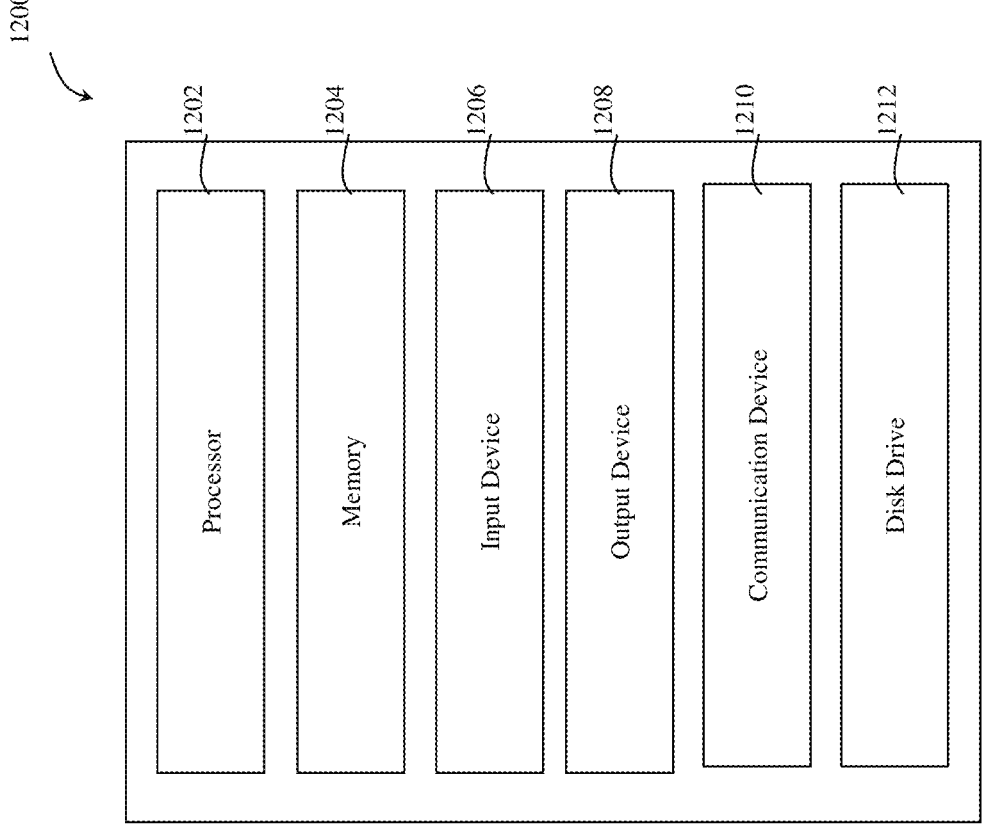
FIG. 12 shows an example information handling system in some embodiments of the invention.

FIG. 12 shows an example information handling system 1200 that can be used to perform one or more of the methods for learning-based bidirectional video compression in embodiments of the invention. The information handling system 1200 generally comprises suitable components necessary to receive, store, and execute appropriate computer instructions, commands, and/or codes. The main components of the information handling system 1200 are a processor 1202 and a memory (storage) 1204. The processor 1202 may include one or more: CPU(s), MCU(s), GPU(s), logic circuit(s), Raspberry Pi chip(s), digital signal processor(s) (DSP), application-specific integrated circuit(s) (ASIC), field-programmable gate array(s) (FPGA), or any other digital or analog circuitry/circuitries configured to interpret and/or to execute program instructions and/or to process signals and/or information and/or data. The memory 1204 may include one or more volatile memory (such as RAM, DRAM, SRAM, etc.), one or more non-volatile memory (such as ROM, PROM, EPROM, EEPROM, FRAM, MRAM, FLASH, SSD, NAND, NVDIMM, etc.), or any of their combinations. Appropriate computer instructions, commands, codes, information and/or data may be stored in the memory 1204. Computer instructions for executing or facilitating executing the method embodiments of the invention may be stored in the memory 1204. The processor 1202 and memory (storage) 1204 may be integrated or separated (and operably connected). Optionally, the information handling system 1200 further includes one or more input devices 1206. Example of such input device 1206 include: keyboard, mouse, stylus, image scanner, microphone, tactile/touch input device (e.g., touch sensitive screen), image/video input device (e.g., camera), etc. Optionally, the information handling system 1200 further includes one or more output devices 1208. Example of such output device 1208 include: display (e.g., monitor, screen, projector, etc.), speaker, headphone, earphone, printer, additive manufacturing machine (e.g., 3D printer), etc. The display may include a LCD display, a LED/OLED display, or other suitable display, which may or may not be touch sensitive. The information handling system 1200 may further include one or more disk drives 1212 which may include one or more of: solid state drive, hard disk drive, optical drive, flash drive, magnetic tape drive, etc. A suitable operating system may be installed in the information handling system 1200, e.g., on the disk drive 1212 or in the memory 1204. The memory 1204 and the disk drive 1212 may be operated by the processor 1202. Optionally, the information handling system 1200 also includes a communication device 1210 for establishing one or more communication links (not shown) with one or more other computing devices, such as servers, personal computers, terminals, tablets, phones, watches, IoT devices, or other wireless computing devices. The communication device 1210 may include one or more of: a modem, a Network Interface Card (NIC), an integrated network interface, a NFC transceiver, a ZigBee transceiver, a Wi-Fi transceiver, a Bluetooth® transceiver, a radio frequency transceiver, a cellular (2G, 3G, 4G, 5G, above 5G, or the like) transceiver, an optical port, an infrared port, a USB connection, or other wired or wireless communication interfaces. Transceiver may be implemented by one or more devices (integrated transmitter(s) and receiver(s), separate transmitter(s) and receiver(s), etc.). The communication link(s) may be wired or wireless for communicating commands, instructions, information and/or data. In one example, the processor 1202, the memory 1204 (optionally the input device(s) 1206, the output device(s) 1208, the communication device(s) 1210 and the disk drive(s) 1212, if present) are connected with each other, directly or indirectly, through a bus, a Peripheral Component Interconnect (PCI), such as PCI Express, a Universal Serial Bus (USB), an optical bus, or other like bus structure. In one embodiment, at least some of these components may be connected wirelessly, e.g., through a network, such as the Internet or a cloud computing network. A person skilled in the art would appreciate that the information handling system 1200 shown in FIG. 12 is merely an example and that the information handling system 1200 can in other embodiments have different configurations (e.g., include additional components, has fewer components, etc.).

Although not required, one or more embodiments described with reference to the Figures can be implemented as an application programming interface (API) or as a series of libraries for use by a developer or can be included within another software application, such as a terminal or computer operating system or a portable computing device operating system. In one or more embodiments, as program modules include routines, programs, objects, components, and data files assisting in the performance of particular functions, the skilled person will understand that the functionality of the software application may be distributed across a number of routines, objects and/or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include (but not limited to) any appropriate arrangement of computer or information processing hardware capable of implementing the function described.

It will be appreciated by a person skilled in the art that variations and/or modifications may be made to the described and/or illustrated embodiments of the invention to provide other embodiments of the invention. The described/ or illustrated embodiments of the invention should therefore be considered in all respects as illustrative, not restrictive. Example optional features of some embodiments of the invention are provided in the summary and the description. Some embodiments of the invention may include one or more of these optional features (some of which are not specifically illustrated in the drawings). Some embodiments of the invention may lack one or more of these optional features (some of which are not specifically illustrated in the drawings).

REFERENCES

[1] V. Sze, M. Budagavi, and G. J. Sullivan, "High efficiency video coding (HEVC)," in *Integrated Circuit and Systems, Algorithms and Architectures*. Springer, 2014, vol. 39, p. 40.

[2] B. Bross, Y.-K. Wang, Y. Ye, S. Liu, J. Chen, G. J. Sullivan, and J. R. Ohm, "Overview of the versatile video coding (VVC) standard and its applications," *IEEE Transactions on Circuits and Systems for Video Technology*, vol. 31, no. 10, pp. 3736-3764, 2021.

[3] G. Lu. W. Ouyang, D. Xu, X. Zhang, C. Cai, and Z. Gao, "DVC: An end-to-end deep video compression framework," in *Proceedings of the IEEE International Conference on Computer Vision*, 2019, pp. 11006-11015.

[4] T. Ladune, P. Philippe, W. Hamidouche, L. Zhang, and O. Deforges,' "Optical flow and mode selection for learning-based video coding," in *IEEE International Workshop on Multimedia Signal Processing*, 2020, pp. 1-6.

[5] J. Li. B. Li, and Y. Lu, "Deep contextual video compression," *Proceedings of Advances in Neural Information Processing Systems*, vol. 34, pp. 18114-18125, 2021.

[6] J. Lin, D. Liu, H. Li, and F. Wu, "M-LVC: Multiple frames prediction for learned video compression," in *Proceedings of the IEEE Conference on Computer Vision and Pattern Recognition*, 2020, pp. 3546-3554.

[7] R. Yang, F. Mentzer, L. V. Gool, and R. Timofte, "Learning for video compression with hierarchical quality and recurrent enhancement," in *Proceedings of the IEEE Conference on Computer Vision and Pattern Recognition*, 2020, pp. 6628-6637.

[8] M. A. Yılmaz and A. M. Tekalp. "End-to-end rate-distortion optimized learned hierarchical bi-directional video compression." *IEEE Transactions on Image Processing*, vol. 31. pp. 974-983, 2021.

[9] R. Pourreza and T. Cohen, "Extending neural p-frame codecs for bframe coding," in *Proceedings of the IEEE International Conference on Computer Vision*, 2021, pp. 6680-6689.

[10] H. Jiang, D. Sun, V. Jampani, M.-H. Yang, E. Learned-Miller, and J. Kautz, "Super slomo: High quality estimation of multiple intermediate frames for video interpolation," in *Proceedings of the IEEE Conference on Computer Vision and Pattern Recognition,* 2018, pp. 9000-9008.

[11] D. Minnen, J. Balle, and G. D. Toderici, "Joint autoregressive and' hierarchical priors for learned image compression," *Proceedings of Advances in Neural Information Processing Systems,* vol. 31, 2018.

[12] D. He. Y. Zheng, B. Sun, Y. Wang, and H. Qin, "Checkerboard context model for efficient learned image compression," in *Proceedings of the IEEE International Conference on Computer Vision,* 2021. pp. 14771-14780.

[13] J. Li. B. Li, and Y. Lu, "Hybrid spatial-temporal entropy modelling for neural video compression." in *Proceedings of the ACM International Conference on Multimedia,* 2022, pp. 1503-1511.

[14] J. Li. B. Li, and Y. Lu, "Neural video compression with diverse contexts," *Proceedings of the IEEE Conference on Computer Vision and Pattern Recognition,* pp. 22616-22626, 2023.

[15] D. He. Z. Yang, W. Peng. R. Ma, H. Qin, and Y. Wang, "ELIC: Efficient learned image compression with unevenly grouped space-channel contextual adaptive coding," in *Proceedings of the IEEE Conference on Computer Vision and Pattern Recognition,* 2022, pp. 5718-5727.

[16] D. Minnen and S. Singh, "Channel-wise autoregressive entropy models for learned image compression," in 2020 *IEEE International Conference on Image Processing (ICIP).* IEEE. 2020, pp. 3339-3343.

[17] J. Balle, V. Laparra, and E. P. Simoncelli, "End-to-end optimized image' compression," in *International Conference on Learning Representations,* 2017.

[18] J. Balle, D. Minnen, S. Singh, S. J. Hwang, and N. Johnston, "Variational' image compression with a scale hyperprior." in *International Conference on Learning Representations,* 2018.

[19] T. Chen, H. Liu, Z. Ma, Q. Shen, X. Cao, and Y. Wang. "End-to end learned image compression via non-local attention optimization and improved context modeling," *IEEE Transactions on Image Processing,* vol. 30, pp. 3179-3191, 2021.

[20] Z. Cheng, H. Sun, M. Takeuchi, and J. Katto, "Learned image compression with discretized gaussian mixture likelihoods and attention modules," in *Proceedings of the IEEE Conference on Computer Vision and Pattern Recognition,* 2020, pp. 7939-7948.

[21] Z. Pan, X. Yi, Y. Zhang, B. Jeon, and S. Kwong, "Efficient in-loop filtering based on enhanced deep convolutional neural networks for hevc," *IEEE Transactions on Image Processing,* vol. 29, pp. 5352-5366, 2020.

[22] A. Ranjan and M. J. Black, "Optical flow estimation using a spatial pyramid network," in *Proceedings of the IEEE Conference on Computer Vision and Pattern Recognition,* 2017, pp. 4161-4170.

[23] Z. Hu, Z. Chen, D. Xu, G. Lu. W. Ouyang, and S. Gu, "Improving deep video compression by resolution-adaptive flow coding." in *Proceedings of the European Conference on Computer Vision,* 2020, pp. 193-209.

[24] H. Guo, S. Kwong, C. Jia, and S. Wang, "Enhanced motion compensation for deep video compression." *IEEE Signal Processing Letters,* vol. 30, pp. 673-677, 2023.

[25] Z. Guo, R. Feng, Z. Zhang. X. Jin, and Z. Chen, "Learning crossscale weighted prediction for efficient neural video compression," *IEEE Transactions on Image Processing,* vol. 32, pp. 3567-3579, 2023.

[26] D. Jin, J. Lei, B. Peng, Z. Pan, L. Li, and N. Ling, "Learned video compression with efficient temporal context learning," *IEEE Transactions on Image Processing,* vol. 32. pp. 3188-3198, 2023.

[27] E. Agustsson, D. Minnen, N. Johnston, J. Balle, S. J. Hwang, and G. Toderici, "Scale-space flow for end-to-end optimized video compression." in *Proceedings of the IEEE Conference on Computer Vision and Pattern Recognition,* 2020, pp. 8503-8512.

[28] X. Sheng, J. Li, B. Li, L. Li, D. Liu, and Y. Lu, "Temporal context mining for learned video compression," *IEEE Transactions on Multimedia,* 2022.

[29] H. Guo, S. Kwong, D. Ye, and S. Wang, "Enhanced context mining and filtering for learned video compression," *IEEE Transactions on Multimedia,* pp. 1-13, 2023.

[30] H. Wang and Z. Chen, "Exploring long- and short-range temporal information for learned video compression," *IEEE Transactions on Image Processing,* vol. 33, pp. 780-792, 2024.

[31] D. Alexandre, H.-M. Hang, and W.-H. Peng, "Hierarchical B-frame Video Coding Using Two-Layer CANF without Motion Coding," in *Proceedings of the IEEE Conference on Computer Vision and Pattern Recognition,* 2023, pp. 10249-10258.

[32] R. Zhang, P. Isola, A. A. Efros, E. Shechtman, and O. Wang, "The unreasonable effectiveness of deep features as a perceptual metric," in *Proceedings of the IEEE Conference on Computer Vision and Pattern Recognition,* 2018, pp. 586-595.

[33] Z. Hu, G. Lu, and D. Xu, "FVC: A new framework towards deep video compression in feature space." in *Proceedings of the IEEE Conference on Computer Vision and Pattern Recognition,* 2021, pp. 1502-1511.

[34] F. Bossen et al., "Common test conditions and software reference configurations," *JCTVC-L*1100, vol. 12, no. 7, 2013.

[35] A. Mercat, M. Viitanen, and J. Vanne, "UVG dataset: 50/120 fps 4 k sequences for video codec analysis and development." in *Proceedings of the ACM Multimedia Systems Conference,* 2020, pp. 297-302.

[36] H. Wang, W. Gan, S. Hu, J. Y. Lin, L. Jin, L. Song, P. Wang, I. Katsavounidis, A. Aaron, and C.-C. J. Kuo, "MCL-JCV: A JND based H. 264/AVC video quality assessment dataset," in *Proceedings of International Conference on Image Processing,* 2016, pp. 1509-1513.

[37] I. Loshchilov and F. Hutter, "Decoupled weight decay regularization," *International Conference on Learning Representations,* 2018.

[38] F. L. Vadim Seregin, Jic Chen and K. Zhang, "JVET AHG report: ECM software development (AHG6)," in *JVET-AA*0006, 2022.

[39] G. Bjøntegaard, "Calculation of Average PSNR Differences between RD-curves (VCEG-M33)," in *VCEG Meeting* (ITU-T SG16 Q. 6), 2001, pp. 2-4.

[40] G. Lu, C. Cai, X. Zhang, L. Chen, W. Ouyang, D. Xu, and Z. Gao, "Content adaptive and error propagation aware deep video compression," 2020.

[41] R. Yang. F. Mentzer. L. Van Gool, and R. Timofte. "Learning for video compression with recurrent autoencoder and recurrent probability model." IEEE Journal of Selected Topics in Signal Processing, vol. 15. no. 2, pp. 388-401, 2020.

The invention claimed is:

1. A computer-implemented method for learning-based bidirectional video compression, comprising steps of:
given a current frame, generating a single reference frame from the current frame and bidirectional frames by using a neural network;

estimating a motion between the current frame and the reference frame;

obtaining a reconstructed motion by inputting the motion to a motion encoder and decoder;

generating a set of temporal contexts based on the reconstructed motion and a propagated feature obtained from coding for a previous frame and stored in a buffer; and compressing the current frame based on the temporal contexts by an inverse channel-wise entropy model which is adapted to divide latent representation of the current frame to be coded into a plurality of groups (N) along with channels and to reconstruct a relationship among the channels such that the channels with less entropy are coded first and the channels with larger entropy are coded with the help of the previously coded channels.

2. The computer-implemented method of claim 1, wherein the step of generating the reference frame comprises:

extracting features from the current frame and the bidirectional frames independently by using the neural network, the bidirectional frames including a previous reconstructed frame and a following reconstructed frame;

obtaining distance values that represent feature similarity between the current frame and the bidirectional frames;

fusing the distance values along with the bidirectional frames to generate the reference frame.

3. The computer-implemented method of claim 2, the step of obtaining distance values further comprises conducting normalization subtraction and weighted averaging on the features.

4. The computer-implemented method of claim 3, wherein the step of extracting features comprises extracting L layers feature stacks from the current frame, the previous reconstructed frame and the following reconstructed frame.

5. The computer-implemented method of claim 4, wherein the step of obtaining distance values comprises, for each distance value:

normalizing the L layers feature stacks from the current frame and the previous or following reconstructed frame, and subtracting the feature stacks in a channel dimension;

scaling each channel and calculating an L2 norm distance; and averaging across spatial dimensions and all layers.

6. The computer-implemented method of claim 2, wherein the distance values comprise a first distance value that represents feature similarity between the current frame and the previous reconstructed frame, and a second distance value that represents feature similarity between the current frame and the following reconstructed frame.

7. The computer-implemented method of claim 1, wherein the neural network comprises a Siamese neural network.

8. The computer-implemented method of claim 1, wherein the inverse channel-wise entropy model is adapted to predict beginning channel parameters with the help of deep channels such that larger entropy channels have more inputs.

9. The computer-implemented method of claim 1, wherein the inverse channel-wise entropy model is adapted to inverse a predicted direction, which predicts the beginning channel parameters with the help of deep channels along with the direction of information accumulation.

10. The computer-implemented method of claim 1, wherein the plurality of groups (N) comprise at least a first group ($1^{st}$) of beginning channels and a last group ($N^{th}$) of last channels, and the inverse channel wise entropy model is adapted to encode the last group first and take the last group parameters as an input of the next group ($N-1^{th}$) coding.

11. The computer-implemented method of claim 10, wherein the element to be coded is divided into the plurality of groups unevenly across the channels.

12. The computer-implemented method of claim 10, wherein the first group has the most significant entropy compared with the rest groups, and entropy distribution is reduced from the first group to the last group.

13. The computer-implemented method of claim 12, wherein the first group of beginning channels have the most inputs.

14. The computer-implemented method of claim 12, wherein the inverse channel-wise entropy model is adapted to encode the first group based on all previous groups.

15. The computer-implemented method of claim 1, wherein the inverse channel-wise entropy model is further adapted to obtain reconstructed groups corresponding to the plurality of groups and to merge the reconstructed groups to obtain a reconstructed element.

16. A system for learning-based bidirectional video compression, comprising:

one or more processors; and a memory storing one or more programs configured to be executed by the one or more processors, the one or more programs including instructions for:

given a current frame, generating a single reference frame from the current frame and bidirectional frames by using a neural network;

estimating a motion between the current frame and the reference frame;

obtaining a reconstructed motion by inputting the motion to a motion encoder and decoder;

generating a set of temporal contexts based on the reconstructed motion and a propagated feature obtained from coding for a previous frame and stored in a buffer; and compressing the current frame based on the temporal contexts by an inverse channel-wise entropy model which is adapted to divide latent representation of the current frame to be coded into a plurality of groups (N) along with channels and to reconstruct a relationship among the channels such that the channels with less entropy are coded first and the channels with larger entropy are coded with the help of the previously coded channels.

17. A non-transitory computer readable medium having instructions stored thereon which, when executed by one or more processors, cause the one or more processors to execute a computer-implemented method for learning-based bidirectional video compression, comprising steps of:

given a current frame, generating a single reference frame from the current frame and bidirectional frames by using a neural network;

estimating a motion between the current frame and the reference frame;

obtaining a reconstructed motion by inputting the motion to a motion encoder and decoder;

generating a set of temporal contexts based on the reconstructed motion and a propagated feature obtained from coding for a previous frame and stored in a buffer; and compressing the current frame based on the temporal contexts by an inverse channel-wise entropy model which is adapted to divide latent representation of the current frame to be coded into a plurality of groups (N) along with channels and to reconstruct a relationship among the channels such that the channels with less entropy are coded first and the channels with larger entropy are coded with the help of the previously coded channels.

* * * * *